(12) United States Patent
Ogawa et al.

(10) Patent No.: US 9,712,609 B2
(45) Date of Patent: Jul. 18, 2017

(54) COMPUTER NETWORK SYSTEM AND METHOD OF DETERMINING NECESSITY OF TRANSFERRING LOAD IN COMPUTER NETWORK SYSTEM

(71) Applicants: NEC Corporation, Tokyo (JP); Masafumi Yano, Miyagi (JP)

(72) Inventors: Masatsugu Ogawa, Tokyo (JP); Takashi Torii, Tokyo (JP); Masaki Kan, Tokyo (JP); Dai Kobayashi, Tokyo (JP); Masafumi Yano, Miyagi (JP)

(73) Assignee: NEC Corporation, Tokyo (JP)

( * ) Notice: Subject to any disclaimer, the term of this patent is extended or adjusted under 35 U.S.C. 154(b) by 222 days.

(21) Appl. No.: 14/420,127

(22) PCT Filed: Jul. 2, 2013

(86) PCT No.: PCT/JP2013/068579
§ 371 (c)(1),
(2) Date: Feb. 6, 2015

(87) PCT Pub. No.: WO2014/024612
PCT Pub. Date: Feb. 13, 2014

(65) Prior Publication Data
US 2015/0163298 A1    Jun. 11, 2015

(30) Foreign Application Priority Data

Aug. 6, 2012  (JP) ................................ 2012-173520

(51) Int. Cl.
*G06F 15/16* (2006.01)
*H04L 29/08* (2006.01)
(Continued)

(52) U.S. Cl.
CPC ........ *H04L 67/1008* (2013.01); *G06F 9/5088* (2013.01); *G06F 11/3433* (2013.01)

(58) Field of Classification Search
USPC ......................................................... 709/217
See application file for complete search history.

(56) References Cited

U.S. PATENT DOCUMENTS

| 5,283,897 A | * | 2/1994 | Georgiadis | ............ | G06F 9/5083 |
|---|---|---|---|---|---|
| | | | | | 711/151 |
| 6,330,583 B1 | * | 12/2001 | Reiffin | .................. | G06F 9/5072 |
| | | | | | 710/261 |

(Continued)

FOREIGN PATENT DOCUMENTS

| JP | 2000-137692 A | 5/2000 |
|---|---|---|
| JP | 2001-109638 A | 4/2001 |

(Continued)

OTHER PUBLICATIONS

International Search Report corresponding to PCT/JP2013/068579, dated Sep. 3, 2013 (4 pages).

(Continued)

*Primary Examiner* — Alicia Baturay
(74) *Attorney, Agent, or Firm* — Wilmer Cutler Pickering Hale and Dorr LLP

(57) ABSTRACT

An evaluation value $D_S$ for evaluating responsiveness of a first node when no loads are being transferred, an evaluation value $D_n$ for evaluating responsiveness of a path P connecting between the first and second nodes assuming that loads are being transferred, and an evaluation value $D_r$ for evaluating responsiveness of the second node $N_2$ assuming that the second node has received a load from the first node are calculated. Whether or not to transfer the load is determined depending upon comparison results of magnitude of $D_S$ and a sum of $D_r + D_n$.

28 Claims, 14 Drawing Sheets

(51) Int. Cl.
*G06F 9/50* (2006.01)
*G06F 11/34* (2006.01)

(56) References Cited

U.S. PATENT DOCUMENTS

| | | | | |
|---|---|---|---|---|
| 6,353,616 | B1 * | 3/2002 | Elwalid | H04L 47/2408 |
| | | | | 370/389 |
| 6,986,139 | B1 | 1/2006 | Kubo | |
| 7,028,297 | B2 * | 4/2006 | Horn | G06F 9/5038 |
| | | | | 707/999.001 |
| 7,554,909 | B2 * | 6/2009 | Raghunath | G06F 9/5038 |
| | | | | 370/230 |
| 8,024,596 | B2 * | 9/2011 | Burge | G06F 9/4862 |
| | | | | 713/300 |
| 8,639,813 | B2 * | 1/2014 | Suganthi | H04L 63/0272 |
| | | | | 709/225 |
| 2004/0025162 | A1 * | 2/2004 | Fisk | G06F 3/0613 |
| | | | | 718/105 |
| 2012/0023504 | A1 * | 1/2012 | Noam | H04L 65/00 |
| | | | | 718/105 |

FOREIGN PATENT DOCUMENTS

| | | |
|---|---|---|
| JP | 2005-004676 A | 1/2005 |
| JP | 2012-141671 A | 7/2012 |

OTHER PUBLICATIONS

Written Opinion corresponding to PCT/JP2013/068579, dated Sep. 3, 2013 (with partial translation) (4 pages).

* cited by examiner (a) EVALUATION FUNCTION (b) RESULTS OF LOAD DISTRIBUTION CONTROL (c) SLOPE OF EVALUATION FUNCTION (a) EVALUATION FUNCTION (b) RESULTS OF LOAD DISTRIBUTION CONTROL (c) SLOPE OF EVALUATION FUNCTION

|  | BANDWIDTH | NODE 1 | NODE 2 | NODE 3 |
|---|---|---|---|---|
| NOT CONTROLLED |  | 10 | 3 | 7 |
| CONTROLLED | 100kbps | 11 | 5 | 4 |
|  | 1Mbps | 10 | 7 | 3 |
| THEORETICAL VALUE |  | 10 | 7 | 3 |

FIG. 15

COMPUTER NETWORK SYSTEM AND METHOD OF DETERMINING NECESSITY OF TRANSFERRING LOAD IN COMPUTER NETWORK SYSTEM

CROSS-REFERENCE TO RELATED APPLICATIONS

This application is a national stage application of International Application No. PCT/JP2013/068579 entitled "Computer Network System and Method of Determining Necessity of Transferring Load in Computer Network System," filed on Jul. 2, 2013, which claims the benefit of the priority of Japanese Patent Application No. 2012-173520, filed on Aug. 6, 2012, the disclosures of each of which are hereby incorporated by reference in their entirety.

TECHNICAL FIELD

The present invention relates to a computer network system including a plurality of computers connected to each other via a network, and more particularly to distribution of a load in this type of network systems.

BACKGROUND ART

There is available a computer network system that integrates a plurality of computers connected to each other via a network so as to provide some services as one computer system. Generally, if this type of network systems has great variations in loads assigned to respective computers, which are to be nodes, then the response performance is impaired in the overall system. Therefore, technology of distributing loads between nodes is often applied to this type of systems in order to equalize the loads.

In order to distribute loads between nodes, most of conventional computer network systems detect a node having a heavy load and distribute part of the load of such a node to another node.

For example, with some computer network systems in which each of nodes is a data server, if the respective nodes have great variations in amount of data stored therein, the amount of data being stored is equalized by transferring partial data from a server having a greater amount of data stored to a server having a smaller amount of data stored. In this case, the amount of data corresponds to a load.

In another example, with some computer network systems in which each of nodes is a calculation server that provides resources for calculation, if the respective nodes have great variations in amount of calculation assigned thereto, the amount of calculation being assigned is equalized by changing assignments from a server having a greater amount of calculation assigned to a server having a smaller amount of calculation assigned. In this case, the amount of calculation assigned corresponds to a load.

DISCLOSURE OF THE INVENTION

Problems To Be Solved By The Invention

In this manner, a conventional system transfers loads to equalize loads between nodes. As a result, the response performance of the overall system is maintained. However, with such a technique, the response performance may be impaired on the contrary as a result of equalized loads.

For example, when a large amount of data is transferred between data servers in order to equalize the amount of data stored, it may take a long time to transfer the data. During that time, the bandwidth is limited in a network path used for the data transfer, which may exert an adverse influence on the response performance of the overall system.

The present invention has been made in view of those circumstances. It is, therefore, an object of the present invention to avoid impairment of response performance that is caused by a distribution process of loads in a computer network system in which a plurality of computers, each of which is to be a node, are connected to each other.

Means To Solve The Problems

In order to solve the aforementioned problems, one aspect of the present invention provides:

a computer network system comprising a plurality of nodes each of which is connected to another node via at least one path, the plurality of nodes comprising at least a first node $N_1$ and a second node $N_2$ connected to the first node $N_1$ via a path P, the computer network system comprising:

means for determining a load $\lambda_x$ subjected to examination of whether or not to be transferred to the second node $N_2$, the load being currently borne by the first node $N_1$;

means for selecting a load component that causes a load corresponding to the load $\lambda_x$ to the first node $N_1$ from among load components currently held by the first node;

means for calculating an evaluation value $D_1$ for evaluating responsiveness of the first node $N_1$ when the first node $N_1$ bears an overall load comprising the load caused by the selected load component, an evaluation value $D_n$ for evaluating responsiveness of the path P assuming that the path P bears a load caused by transfer of the selected load component in addition to a load currently borne by the path P, and an evaluation value $D_2$ for evaluating responsiveness of the second node $N_2$ assuming that the second node $N_2$ bears a load caused by the selected load component in addition to a load currently borne by the second node; and means for determining whether or not to transfer the transfer load component depending upon comparison of magnitude of $D_1$ and a sum of $D_2+D_n$.

Furthermore, another aspect of the present invention provides:

a computer in a computer network system comprising a plurality of nodes each of which is connected to another node via at least one path, the plurality of nodes comprising at least a first node $N_1$ and a second node $N_2$ connected to the first node $N_1$ via a path P, the computer operating as one of the plurality of nodes, the computer comprising:

means for determining a load $\lambda_x$ subjected to examination of whether or not to be transferred to the second node $N_2$, the load being currently borne by the first node $N_1$;

means for selecting a load component that causes a load corresponding to the load $\lambda_x$ to the first node $N_1$ from among load components currently held by the first node;

means for calculating an evaluation value $D_1$ for evaluating responsiveness of the first node $N_1$ when the first node $N_1$ bears an overall load comprising the load caused by the selected load component, an evaluation value $D_n$ for evaluating responsiveness of the path P assuming that the path P bears a load caused by the selected load component in addition to a load currently borne by the path P, and an evaluation value $D_2$ for evaluating responsiveness of the second node $N_2$ assuming that the second node $N_2$ bears a load caused by the selected load component in addition to a load currently borne by the second node; and means for determining whether or not to transfer the transfer load component depending upon comparison of magnitude of $D_1$ and a sum of $D_2+D_n$.

Moreover, another aspect of the present invention provides:

a program for allowing a computer in a computer network system to serve as means, the computer network comprising a plurality of nodes each of which is connected to another node via at least one path, the plurality of nodes comprising at least a first node $N_1$ and a second node $N_2$ connected to the first node $N_1$ via a path P, the computer operating as one of the plurality of nodes, the means comprising:

means for determining a load $\lambda_x$ subjected to examination of whether or not to be transferred to the second node $N_2$, the load being currently borne by the first node $N_1$;

means for selecting a load component that causes a load corresponding to the load $\lambda_x$ to the first node $N_1$ from among load components currently held by the first node;

means for calculating an evaluation value $D_1$ for evaluating responsiveness of the first node $N_1$ when the first node $N_1$ bears an overall load comprising the load caused by the selected load component, an evaluation value $D_n$ for evaluating responsiveness of the path P assuming that the path P bears a load caused by transfer of the selected load component in addition to a load currently borne by the path P, and an evaluation value $D_2$ for evaluating responsiveness of the second node $N_2$ assuming that the second node $N_2$ bears a load caused by the selected load component in addition to a load currently borne by the second node; and means for determining whether or not to transfer the transfer load component depending upon comparison of magnitude of $D_1$ and a sum of $D_2+D_n$.

Furthermore, another aspect of the present invention provides:

a method of determining whether or not to transfer a load between nodes in a computer network system comprising a plurality of nodes each of which is connected to another node via at least one path, the plurality of nodes comprising at least a first node $N_1$ and a second node $N_2$ connected to the first node $N_1$ via a path P, the method comprising:

a step of determining a load 2 subjected to examination of whether or not to be transferred to the second node $N_2$, the load being currently borne by the first node $N_1$;

a step of selecting a load component that causes a load corresponding to the load $\lambda_x$ to the first node $N_1$ from among load components currently held by the first node;

a step of calculating an evaluation value $D_1$ for evaluating responsiveness of the first node $N_1$ when the first node $N_1$ bears an overall load comprising the load caused by the selected load component, an evaluation value $D_n$ for evaluating responsiveness of the path P assuming that the path P bears a load caused by transfer of the selected load component in addition to a load currently borne by the path P, and an evaluation value $D_2$ for evaluating responsiveness of the second node $N_2$ assuming that the second node $N_2$ bears a load caused by the selected load component in addition to a load currently borne by the second node; and a step of determining whether or not to transfer the transfer load component depending upon comparison of magnitude of $D_1$ and a sum of $D_2+D_n$.

Effect of the Invention

According to the present invention, whether or not to actually transfer a load component is determined in consideration not only of responsiveness of the first and second nodes, but also of responsiveness of the path connecting between those nodes. Therefore, according to the present invention, impairment of the response of the overall system, which would be caused by impaired responsiveness of the network, can be avoided even if a load component is transferred from a node having load components that are concentrated to a node having load components that are not so concentrated in order to improve the response of the overall system.

BRIEF DESCRIPTION OF THE DRAWINGS

FIG. 15 is a table showing the number of sets of data stored in a node to which the present invention has been applied after 50 seconds.

MODES FOR EMBODYING THE INVENTION

Figure 1:
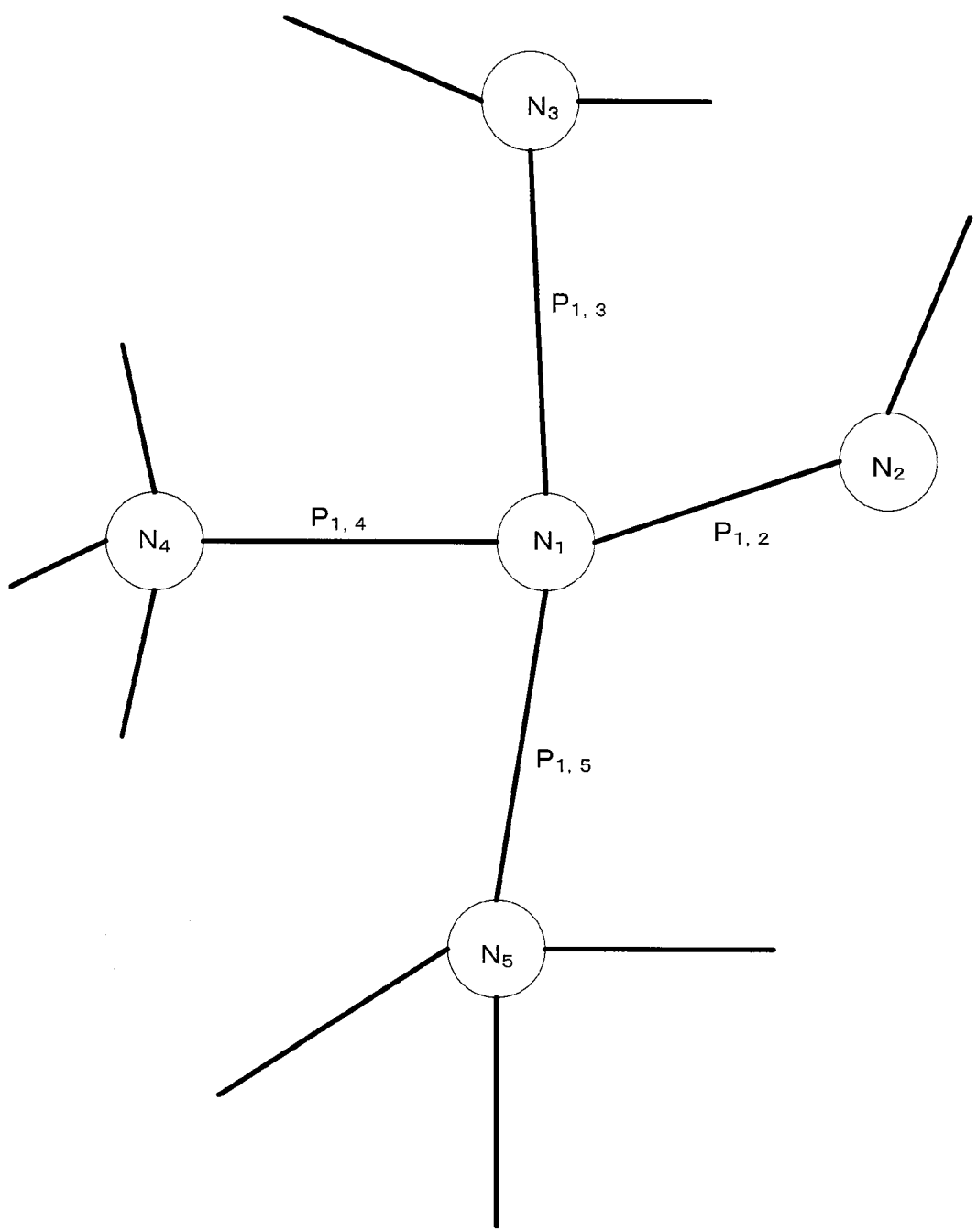
FIG. 1 is a diagram explanatory of a computer network system according to an embodiment of the present invention.

A computer network system 1 will be described as an embodiment of the present invention. Referring to FIG. 1, the computer network system 1 comprises a network including a plurality of computers $N_1, N_2, \ldots, N_m$ where m is a natural number. A path connecting between the computer $N_1$ and the computer $N_2$ is denoted by $P_{1,2}$.

Figure 2:
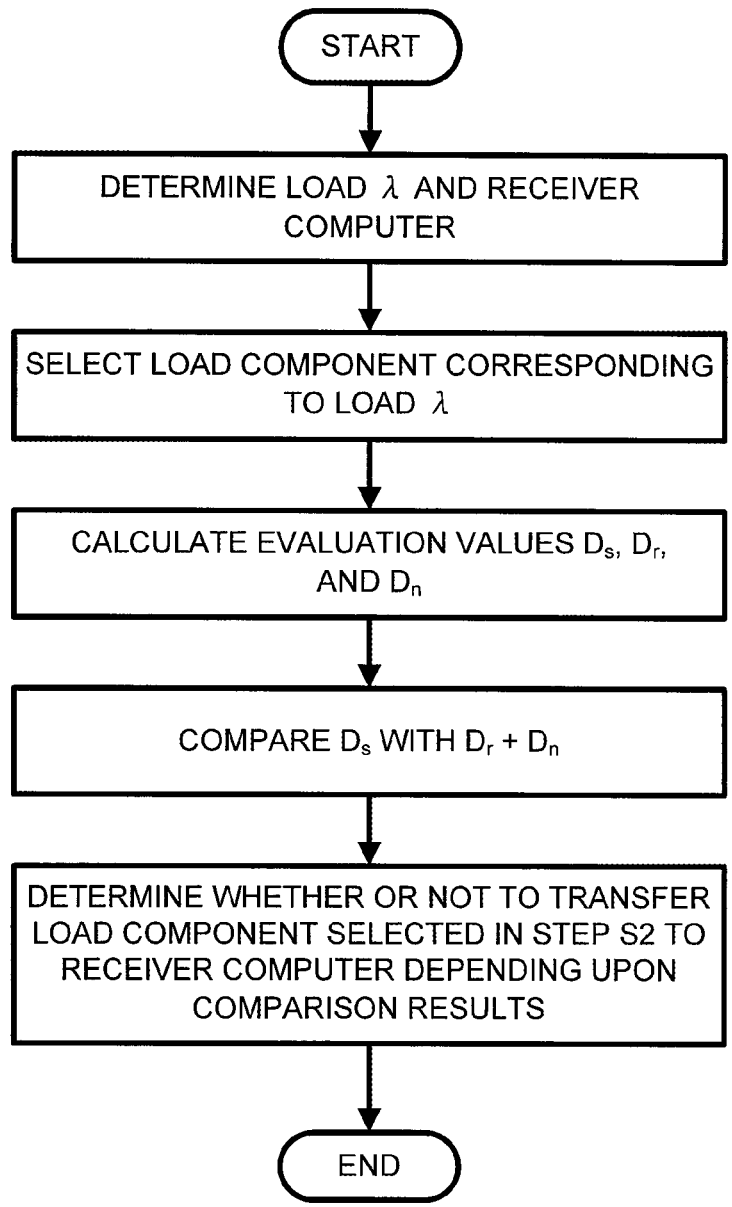
FIG. 2 is a flow chart explanatory of a method of determining whether or not a node of a computer network system according to the present invention is to transfer a load component.

Now an operation of the computer network system 1 will be described with reference to FIG. 2. It is assumed that loads are concentrating on the computer $N_1$.

(Step S1) The amount of load to be distributed from the computer $N_1$ to another computer and a receiver computer to which the load is to be transferred are determined. In this example, the amount of load to be distributed from the computer $N_1$ to another computer is defined as and a possible receiver computer is assumed to be the computer $N_2$. If the computer network system 1 comprises an autonomous distributed control system in which each of the computers autonomously controls itself, then the determination of the load $\lambda$ and the receiver computer is made by the computer $N_1$ itself. If the computer network system 1 comprises a centralized control system in which a centralized control computer for controlling the overall system 1 controls the computer $N_1$, then the determination of the load and the receiver computer is made by the centralized control computer.

(Step S2) The computer $N_1$ selects one or more appropriate load components depending upon the load $\lambda$ to be distributed. The load component refers to a component that causes loads and, for example, includes data managed by the computer of interest, data stored in a memory device of the computer, of interest and a process assigned to the computer of interest. In a case where loads per load component are to be equalized, a load component is selected such that the sum of loads of the selected load component is the same as the load $\lambda$ or is as close to the load $\lambda$ as possible.

If the volumes of loads caused by respective load components can be regarded as being the same, a load component may randomly be selected from among load components managed by the computer $N_1$ such that the sum of loads is the same as the load $\lambda$ or is as close to the load $\lambda$ as possible.

If the volumes of loads caused by respective load components are different, a load component is selected in consideration of the volume of loads per load component. It is preferable to calculate the volume of loads per load component prior to Step S1. For example, when data managed by each computer are used as the load component, the computer $N_1$ monitors access to respective data managed by the computer $N_1$, records the frequency of access to those data, evaluates loads of data for each set of data depending upon the frequency of access, and selects a combination of sets of data such that the sum of loads of the data is the same as the load $\lambda$ or is as close to the load $\lambda$ as possible.

Generally, when loads are not homogeneous, it is necessary to measure individual loads rather than the overall load. Thus, it is difficult to measure loads of a server or a CPU with direct values such as a CPU usage. Loads of individual data are converted into loads of a server or a CPU with the frequency of access to the data in the following manner.

A load $\lambda_{ij}$ of data j in a data server i is given by the following Formula 1 where an observable value for the data j is defined as $K_{1j}$.

$$\lambda_{ij} = g_j(K_{1j}) \qquad \text{Formula 1}$$

The function $g_j$ is predetermined by measurements or the like. Examples of the observable value include a frequency of access to the data j and the number of replicas of the data j.

The number of types of observable values used to calculate the load $\lambda_{ij}$ is not limited to one, and may be two or more. For example, it is assumed that the frequency of access to the data j is represented by $K_{1j}$ and that the number of replicas of the data j is represented by $K_{2j}$. Generally, the number of replicas of data is in inverse proportion to the frequency of access to one of those replicas. When the load $\lambda_{ij}$ is calculated in view of this inverse proportion based upon the observable values $K_{1j}$ and $K_{2j}$, the function g can be expressed by the following Formula 2.

$$\lambda_{ij} = g_j(K_{1j})/K_{2j} \qquad \text{Formula 2}$$

The concept that the load is calculated based upon multiple observable values can further be advanced and generalized to a case where the load $\lambda_{ij}$ is calculated based upon m types of observable values relating to the data j where m is a natural number. Specifically, the load $\lambda_{ij}$ of the data j in the data server i can be expressed by the following Formula 3 based upon m types of observable values $K_{1j}, K_{2j}, \ldots, K_{mj}$ relating to the data j.

$$\lambda_{ij} = g_j(K_{1j}, K_{2j}, \ldots, K_{mj}) \qquad \text{Formula 3}$$

Based upon Formula 3, a load $\lambda_i$ imposed on the data server i by all of data stored in the data server i can be expressed by the following Formula 4.

$$\lambda_i = \sum_j g_j(K_{1j}, K_{2j}, \ldots, K_{mj}) \qquad \text{Formula 4}$$

If the conversion function $g_j$ does not vary among individual data, a common conversion function may be used for all of data.

In this manner, a load is determined for each set of data in the data server. Then possible data to be transferred are determined. For this determination, the following Formulas 5 and 6 can be used. A differential of an evaluation function $f_i$ of the data server i when the load of the data server i is $\lambda_i$ is represented by $df_i/d\lambda_i$, and a differential of an evaluation function $f_k$ of a data server k when the load of the data server k at that time is $\lambda_k$ is represented by $df_k/d\lambda_k$. At that time, the amount of load $d\lambda_i/dt$ to be exchanged between the data server i and the data server k can be calculated from the following Formulas 5 and 6. $K_1$ is a coefficient corresponding to a gain of the load exchange. $\lambda_{nom, i}$ represents a normalization coefficient of the data server i. If the system includes data servers having different performances, an evaluation function normalized through the overall system is determined in many cases. Furthermore, a normalization coefficient is determined for each of data servers depending upon the performance or the scale of the server. It is convenient to represent an evaluation function of each of the data servers by multiplying the normalized evaluation function by the normalization coefficient. Therefore, a normalization coefficient is used in this example.

$$\frac{d\lambda}{dt} = K_1 \cdot \left( \frac{df_i}{d\lambda_i} - \frac{df_k}{d\lambda_k} \right) \qquad \text{Formula 5}$$

$$\frac{d\lambda_i}{dt} = K_1 \cdot \lambda_{nom,i} \frac{\sum_k \lambda_{nom,k} \left( \frac{df_i}{d\lambda_i} - \frac{df_k}{d\lambda_k} \right)}{\sum_k \lambda_{nom,k}} \qquad \text{Formula 6}$$

Here, a determination using Formula 5 is described. According to Formula 5, the load $d\lambda_i/dt$ to be exchanged between the data server i and the data server k is found. After the load $d\lambda_i/dt$ has been found, data having a load $\lambda_{ij}$ that matches with the load $d\lambda_i/dt$ are selected in the data server that is to transfer the load. One set of data may be selected, or multiple sets of data may be selected. In the case where multiple sets of data are selected, the sum of the loads $\lambda_{ij}$ of the selected data is the amount of loads to be transferred. Possible data to be transferred are selected so that the load is as close to the load calculated by Formula 5 as possible. If the network does not affect the performance, the possible data selected are simply transferred. Thus, an optimal load distribution can be implemented.

The above method individually evaluates loads, controls the loads in a manner corresponding to the characteristics of Formula 5, and can thus cope with cases where loads are varied according to the type of data so that the loads are not homogeneous, and cannot continuously be sliced.

(Step S3) The computer $N_1$ calculates an evaluation value $D_s$ indicative of the responsiveness of the computer $N_1$ in a case where no loads are transferred and evaluation values $D_r$ and $D_n$ indicative of the expected responsiveness of the computer $N_2$ and the path $P_{1,\,2}$, respectively, in a case where loads are transferred.

$D_s$, $D_r$, and $D_n$ are functions that are uniquely determined by an index $\mu$, which is determined depending upon the performance of the computer $N_1$, the computer $N_2$, and the path, respectively. Inputs of the functions are loads $\lambda$ to the computer $N_1$, the computer $N_2$, and the path $P_{1,\,2}$, and outputs of the functions are values indicative of the responsiveness of the computer $N_1$, the computer $N_2$, and the path $P_{1,\,2}$ to the loads $\lambda$.

It is now assumed that the computer $N_1$ holds data d and is examining whether to transfer the data d. At that time, the evaluation value $D_s$, the evaluation value $D_r$, and the evaluation value $D_n$ are defined as follows.

The evaluation value $D_s$ is a value indicative of the current responsiveness of the computer $N_1$.

The evaluation value $D_r$ is a value indicative of the responsiveness of the computer $N_2$ on the assumption that the computer $N_2$ holds the data d while other conditions are as they are. The computer $N_2$ is currently bearing some loads. Assuming that the computer $N_2$ holds the data d, the computer $N_2$ bears an additional load caused by such holding. Therefore, assuming that the computer $N_2$ holds the data d, the responsiveness of the computer $N_2$ is affected. The evaluation value $D_r$ is a value indicative of the responsiveness of the computer $N_2$ on the assumption that the computer $N_2$ bears the additional load caused by the holding of the data d in addition to the currently bearing loads. This holds true for a case where the load currently borne by the computer $N_2$ is zero.

The evaluation value $D_n$ is a value indicative of the responsiveness of the network on the assumption that the network between the computer $N_1$ and the computer $N_2$ is currently transferring the data d while other conditions are as they are. The path P connecting between the computer $N_1$ and the computer $N_2$ bears a load caused by the data being currently transferred. The data being transferred by the path P includes not only data transferred to or from one of the computer $N_1$ and the computer $N_2$, but also data transferred to or from a computer other than the computers $N_1$ and $N_2$. Assuming that the path P transfers the data d in addition to the data being currently transferred as described above, the path P bears an additional load caused by the transfer of the data d. Therefore, assuming that the path P transfers the data d, the responsiveness of the path P is affected. The evaluation value $D_n$ is a value indicative of the responsiveness of the path P on the assumption that the path P transfers the data d in addition to the data being currently transferred. This holds true for a case where the path P is currently transferring no data.

(Step S4) The computer $N_1$ compares $D_s$ with the sum of $D_r$ and $D_n$ ($=D_r+D_n$). As described above, the evaluation values $D_s$, $D_r$, and $D_n$ are values obtained when the computer or the path is currently bearing the data d or when it is assumed that the computer or the path is currently bearing the data d. In this step, a comparison is made on the assumption that the same data d are concurrently present in the computers $N_1$ and $N_2$ and on the path $P_{1,\,2}$ between the computers $N_1$ and $N_2$. Such a situation is not feasible in a practical application. The inventors have found that even such an approximate comparison can achieve an effective control if the transfer of the data d from the computer $N_1$ to the computer $N_2$ is completed within a sufficiently short period of time. This finding bases the present invention.

(Step S5) The computer $N_1$ determines whether to transfer the selected load component to the computer $N_2$ depending upon the comparison results.

(Example 1)

There will be described an example where the computer network system 1 is an autonomous distributed control system in which each of the computers $N_1, N_2, \ldots,$ and $N_m$ is a data server and where the load component is data. In this example, the computer network system 1 comprises a data center in which a plurality of data servers are connected via a network. Thus, the present invention is applied to load distribution for data arrangement in a group of data servers.

The load distribution for data arrangement in a data center is performed in order to avoid shutdown of a particular data server when data with a high access frequency are unevenly present in the particular data server. In other words, data with a high access frequency that have been concentrated on a particular data server are transferred to another unoccupied data server for distributing the loads.

One of the simplest load distribution control methods that have been examined so far includes monitoring all of data servers with a central control unit and transferring data of a data server having heavy loads to a data server having light loads.

However, if the number of data servers increases, a central control unit becomes unable to control those data servers. Therefore, this load distribution control has not functioned well in a recent large-scaled system. In a large-scaled system, each of data servers is desired to operate in an autonomous distributed manner.

One of autonomous distributed control methods includes monitoring characteristics of data statistically, for example, determining characteristics such as loads concentrated on a certain set of data at a certain point of time, creating a scenario based upon such characteristics, and distributing loads according to this scenario. Since this method uses a prediction scenario for control, this control may be referred to as a scenario-based control.

With such control, an autonomous distributed operation can be performed within a supposed scenario. However, once any event unexpected by the scenario occurs, the autonomous distributed operation is broken down. Accordingly, there has been desired a data arrangement load distribution control method that can perform an autonomous distributed operation and can also adapt to changes of an external environment.

(1) Determination of the Load $\lambda$ and the Receiver Computer

Figure 3:
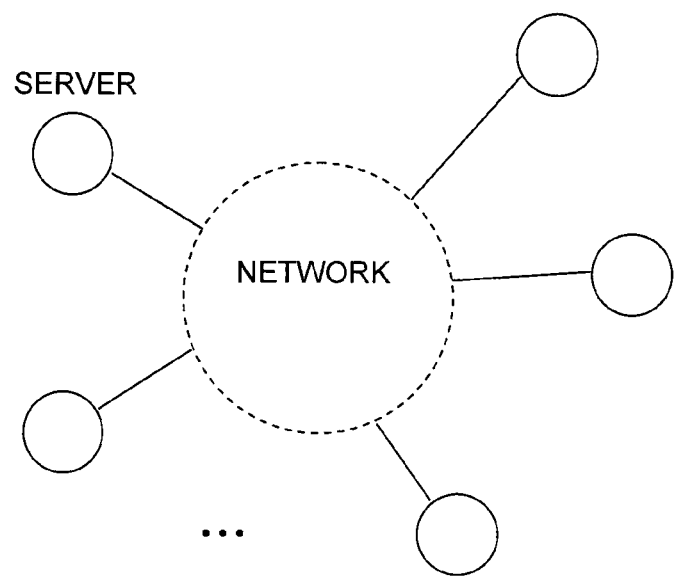
FIG. 3 is a diagram explanatory of a general computer network system.

It is assumed that servers having different performances are mixed. Now we think a problem that a plurality of servers (N servers) having different performances form a network and that processes (loads) randomly provided to those servers are distributed to all of the servers for efficient processing. The efficient processing refers to minimizing a response in the overall system or maximizing the energy efficiency in the overall system. Such a problem of the load distribution includes activation and shutdown of servers having a low efficiency. Therefore, this problem is referred to as the "unit commitment problem." FIG. 3 is a schematic diagram of this problem.

We have examined this problem and, as a result, found out the following method. The problem to be solved has a structure in which two problems are intermingled. One of the problems is determination of activation and shutdown. The other problem is arrangement of loads. In this specification, a controlled system is represented as a function block, a component, a resource, and a node, which are exchangeable with each other.

The activation/shutdown is a problem of determining or managing which resource is to be used or is not to be used in a group of resources. The arrangement of loads is a problem of how to assign a task provided to the overall system for optimization based upon a certain index on the assumption that resources are provided. Attempts have heretofore been made to separately solve those problems with a stochastic approach. However, with the simple theory of probability, it is difficult to quickly respond to an ever-changing environment in a robust manner and in real-time depending upon the circumstances.

Figure 4:
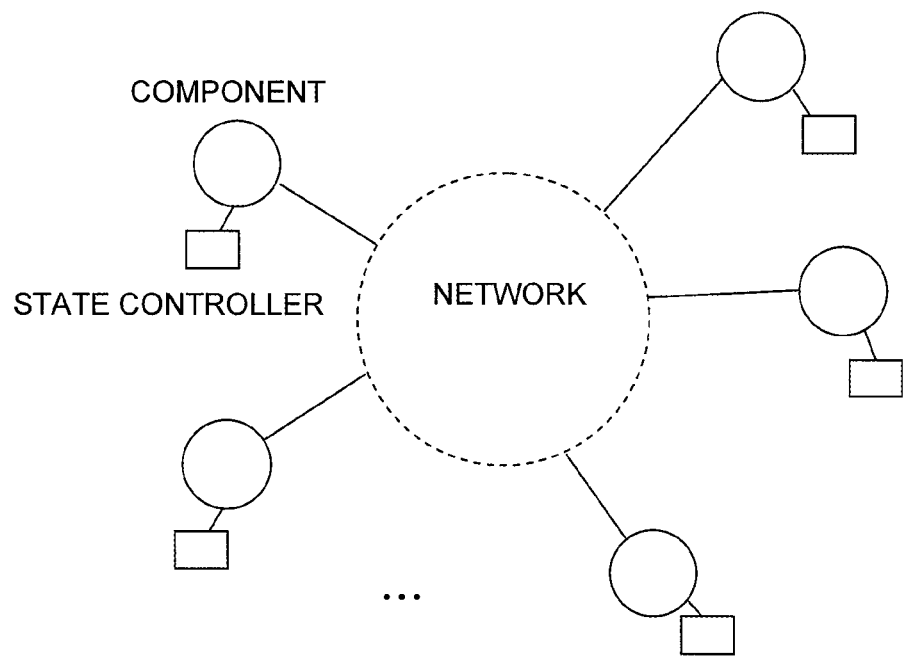
FIG. 4 is a diagram in which state controllers for making the determination of FIG. 2 have been added to the computer network system of FIG. 3.

We have found a method of integrating those two problems into one to respond in robust manner and in real-time depending upon the circumstances. At that time, we have found a method of solving each of the problems with a deterministic approach or a relational approach, instead of a stochastic approach. A block that solves the "unit commitment problem" in real-time and controls a component is referred to as a state controller, which is attached to each of components as shown in FIG. 4. In FIG. 4, the state controllers are illustrated as being provided outside of the components. However, the state controllers may be provided within the components. In this example, the activation/shutdown and the arrangement of loads are solved integrally for perfect optimization. Of course, only the activation/shutdown may be determined separately.

Figure 5:
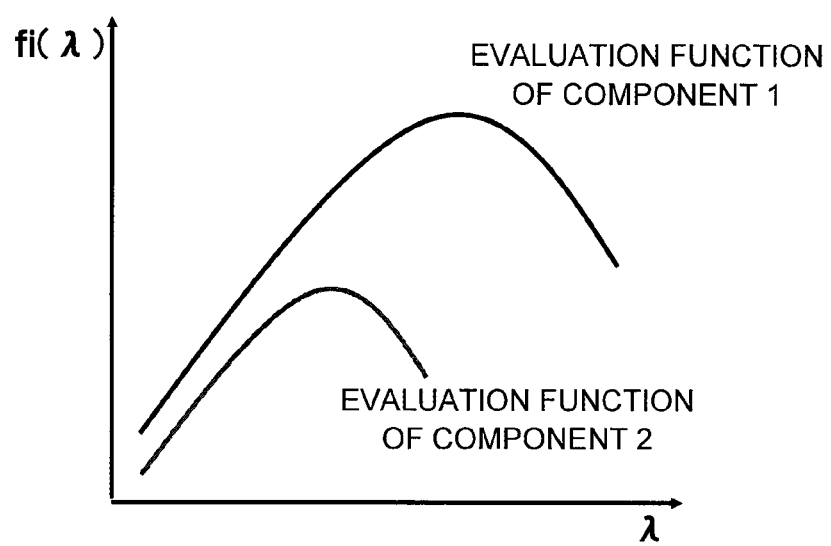
FIG. 5 is a diagram explanatory of an evaluation function $f_i$ of a component 1, i.e., a data server 1 as a storage device, and an evaluation function $f_j$ of a component 2, i.e., a data server 2 as another storage device.

First, evaluation functions f relating to the respective components are introduced as shown in FIG. 5. The evaluation function f is a function that is predetermined for a node such as a data server or for a network between data servers, depending upon the performance of the node or the network. The evaluation function f is a function that has a variable of a parameter $\lambda$ indicative of a state of a data server or a network between data servers at a certain point of time. So to speak, the function f is determined as a guideline for control. The function f does not necessarily include only measurable values or values calculated from measured values, and may include only measurable values or values calculated from measured values. The horizontal axis of the function f represents a parameter for a state of a component, which corresponds to a load of a server or the like in this example. The vertical axis of the function f represents an index for a kind of efficiency or profit. Detailed examples of such a kind of efficiency or profit will be described in the section of examples. In this context, therefore, you should think that such a kind of efficiency or profit means general efficiency. The evaluation function for this efficiency is represented by a convex function. To use a convex function is one of important points of a control method performed in this step. This is because, in many systems, a kind of efficiency or the stability of a system can be represented by a convex function as shown in FIG. 5. A function that is upward convex as shown in FIG. 5 may be referred to as a concave function, whereas a function that is downward convex may be referred to as a convex function. In this example, such expressions are differentiated in terms of characteristics of functions. Thus, a concave function may also be referred to as a convex function.

A problem to achieve an overall optimization (a state in which the sum total of values of evaluation functions for respective components are maximized) in cooperation with components each having a convex function as the evaluation function has been known as the "convex programming problem." It has mathematically been proven that optimization is achieved in the convex programming problem when differential values of the evaluation functions are equal at an operation level of the components. This principle is employed in this example. This is the reason why a convex function is used as an evaluation function.

In consideration of this principle, state changes of the respective components (the load distribution in the case of servers) are controlled in accordance with the equation of Formula 5. In this equation, $K_1$ is a coefficient corresponding to a gain of the state changes. Each of the components is to change its state such that differential values $df_i/d\lambda_i$ of the evaluation functions are equal to each other. As described in connection with the "convex programming problem," this is equivalent to controlling a state (load) of each of components into a point at which the overall profit is maximized. In other words, the control according to Formula 5 maximizes the efficiencies set by the vertical axis of the evaluation functions in the overall system. k refers to the number of a component adjacent to the component i. If there are a plurality of adjacent components, the control according to Formula 5 is sequentially repeated.

Formula 5 has a key point other than the efficiency maximization. This key point is that Formula 5 requires the component i and the component k to undergo state changes with the same absolute value and the opposite sign. This means that the sum total of state changes of a component and an adjacent component is zero at a certain point of time. Such control can properly satisfy the total load requirements required for the overall system while loads are transferred with a local autonomous distributed process in response to local load requirements in the overall system. For the "unit commitment problem," there is a total requirement (total demand) that should be satisfied in the overall system (the entire server network in this case). To satisfy this total requirement is also referred to as demand-supply balancing, which constitutes one of constraints. Maximization of the efficiency or the profit does not make sense if this constraint is not satisfied. Generally, the total requirement of the overall system is calculated, and the amount of loads to be distributed to components is determined based upon the total requirement. Such a conventional method requires a component for collectively controlling the overall system to arrange the total requirement of the overall system. With the present method, the total requirement can be satisfied with a local autonomous distributed process by balancing the transfer of loads without arranging the total requirement of the overall system. This is particularly effective in a large-scale network having a difficulty in setting a component for collectively controlling the overall system.

The control method in this step can also be performed using the aforementioned Formula 6. The symbol $\lambda_{norm, i}$ represents a normalization coefficient of component i. Because multiplication by a coefficient that has been normalized in the overall system is often preferable in a case of heterogeneous components, $\lambda_{norm, i}$ is introduced into Formula 6. $\lambda_{nom, i}$ corresponds to the capability or scale of the component. In the case of Formula 6, the transfer of loads is not automatically balanced between components unlike Formula 5. Therefore, some mechanism needs to be added such that the total sum of state changes of a certain component and an adjacent component becomes zero at a certain point of time.

The simplest example of such mechanism is as follows: For example, when a component i seeks to provide a load to an adjacent component (when Formula 6 has a negative value), components that seek to receive a load (components in which Formula 6 has a positive value) are selected from among adjacent components. The value derived from Formula 6 is divided by the total number of such components. The divided loads thus calculated are distributed to the components that seek to receive a load.

Another method may include examining states of loads of adjacent components upon distribution and distributing loads while weighting components that are likely to receive a load (more weight on a component in which Formula 6 has a larger positive value). The likelihood for an adjacent component to receive a load can be obtained from comparison of differential values of the evaluation functions as with the principle of the present control.

The aforementioned method allows the system to solve the problem of load arrangement in real-time while the overall demand is being satisfied. There will be described how to determine the activation/shutdown, or what component is activated and what component is shut down.

Figure 6:
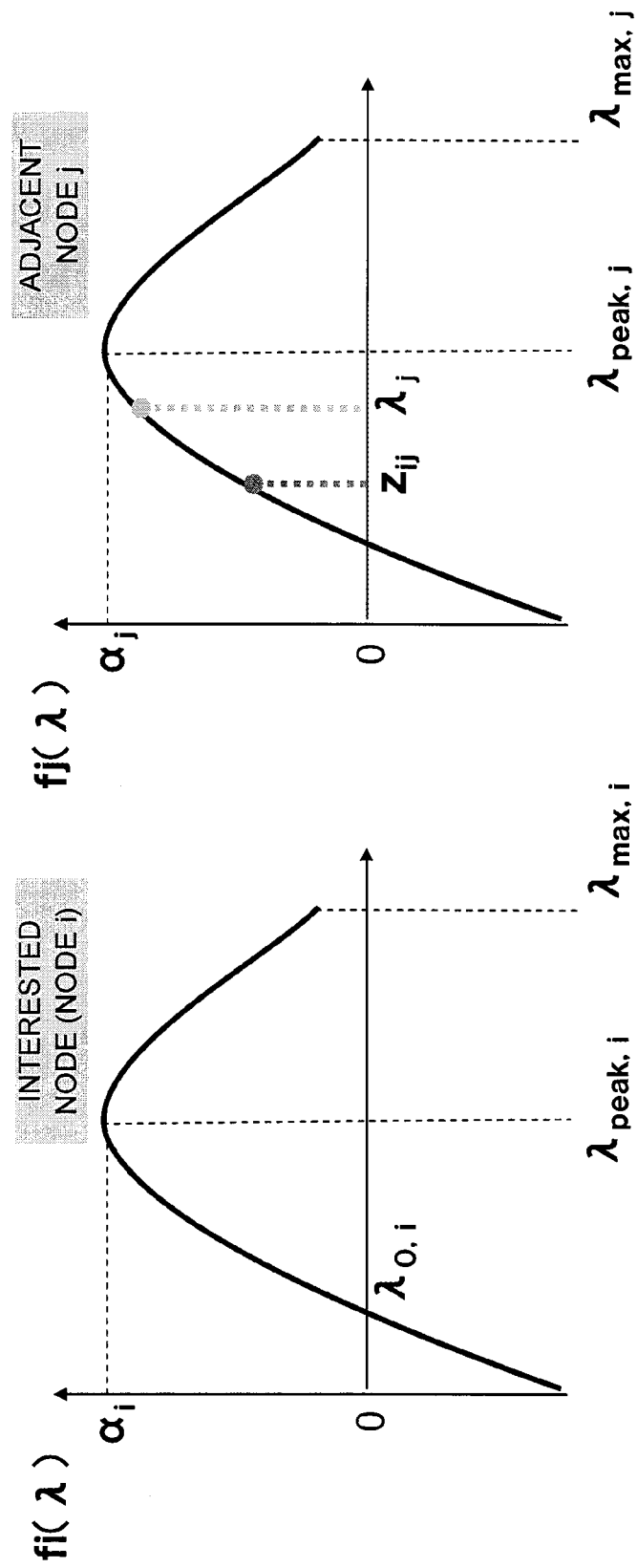
FIG. 6 is a graph to further explain the evaluation functions $f_i$ and $f_j$.

First, an index is defined between an evaluation function of a component and an evaluation function of a node adjacent to the component. FIG. 6 is an illustration to explain the definition of the index. When the load is zero, the efficiency or profit (vertical axis) has a negative value. This means that cost is incurred by activation. This may be somewhat difficult to think in the IT field including servers and the like. For example, it is assumed that the vertical axis represents the profit in a case of a power plant. If no demand grows while the power plant is operated (activated), then the running cost exceeds the recovery (collection from consumers). Therefore, the profit becomes negative. The running cost and the recovery are balanced at a point where the evaluation function becomes zero. A positive value of the evaluation function means that a profit arises. As will be described in the following examples, when the response of the data center is optimized, the vertical axis represents a response-related value. The evaluation function has a positive value even when the load is zero. The evaluation function may have a positive value in some cases and a negative value in other cases when the load is zero. Nevertheless, if the evaluation function is assumed to have a negative value, then a case where the evaluation function has a positive value can be solved as part of the assumption. Therefore, this example is explained in the case where the evaluation function has a negative value when the load is zero.

Now it is assumed that a zero crossing point of a node i (interested) is defined as $\lambda_0$, a point of the evaluation function of an adjacent node j that has the same gradient as the gradient at the zero crossing point of the node i is defined as $z_{ij}$, and a current load of the adjacent node j is defined as $\lambda_j$. Thus, $z_{ij}$ can be expressed by the following Formula 7.

$$\left(\frac{df_j}{d\lambda_j}\right)_{\lambda_j = z_{ij}} = \left(\frac{df_i}{d\lambda_i}\right)_{\lambda_i = \lambda_{0,i}} \quad \text{Formula 7}$$

Then an index represented by the following Formula 8 is defined.

$$S_i = \sum_{j \neq i} (\lambda_j - z_{ij}) - \lambda_{0,i} \quad \text{Formula 8}$$

This index indicates how much the current loads (total sum) of the adjacent nodes are heavier than the load at the zero crossing point of the node of interest. A condition for activating the node i that has been shut down is whether the node i will bear a load equal to or heavier than the load at the zero crossing point if the node i is activated. Thus, the profit of the overall system is prevented from decreasing to a negative value (i.e., the evaluation function having a negative value). Therefore, it is not disadvantageous to activate the node i. The index $S_i$ is digitization of this condition. The first term in the right side indicates how much the load borne by the adjacent node is heavier than $z_{ij}$, which is equivalent to the differential value of the evaluation function at the zero crossing point of the node i. The value $\lambda_{0,i}$ at the zero crossing point is subtracted from the value of the first term in the right side (the second term in the right side) to obtain an index indicative of whether loads around the node of interest are equal to or heavier than the load at the zero crossing point of the node of interest. If $S_i$ is larger than zero, a load borne by one of adjacent nodes is transferred to the node i when the node i is activated. The load to be borne by the node i is equal to or heavier than the load at the zero crossing point. Conversely, in a case where $S_i$ is smaller than zero, even if the node i additionally bears a load that has been borne by an adjacent node, a load borne by the node i is equal to or lighter than the load at the zero crossing point. Therefore, the profit of the overall system becomes negative when the node i is activated. The index $S_i$ has such characteristics. Thus, knowing whether $S_i$ is positive or negative teaches us whether to activate or shut down the node i. When $S_i$ is negative, the load of the node i at that time is in a range in which the evaluation function has a negative value. Therefore, it can be understood that the node being activated will be shut down at the time when the evaluation function becomes zero or less.

Another thing should be taken into consideration when an activated node is shut down. It relates to activation/shutdown in a case where nodes have the same performance. It is often better to activate only any one of nodes and shut down the rest of the nodes. In a case where nodes have the same performance, however, a conventional method cannot determine which nodes should be shut down. Accordingly, we have introduced the following algorithm to the control.

"A node is shut down when the evaluation function has a value that is equal to or less than zero and is the smallest among nodes including adjacent nodes. The values are compared between activated nodes. The node is shut down even if a plurality of nodes have the minimum value."

Thus, in a case where the network is a completely connected network, only one node ultimately remains even if all nodes have the same performance. In a case where the network is loosely connected (all components are not connected to each other and are sparsely connected), a few segments (a group of activated nodes each of which is isolated by surrounding shutdown nodes) may remain even with this algorithm. Such a case can be coped with by searching for practically adjacent nodes (a group of activated nodes located beyond shutdown nodes) via a load balancer or by other methods.

As described above, the "unit commitment problem" can be solved in real-time by controlling the system with Formula 5, monitoring the index of Formula 8, and determining activation and shutdown based upon the shutdown algorithm. This is revolutionary as compared to a conventional method that solves "unit commitment problem" by pre-scheduling, because the present method can quickly respond to an unexpected external disturbance or demand-supply changes in real-time.

Furthermore, this system operates in an autonomous distributed manner. Therefore, even if a component of the system is broken, other components autonomously make recovery to compensate for lost signals from the broken component. Moreover, even if components are suddenly added or removed, the system can gradually shift toward a proper operation in an autonomous manner. In other words, the system is very robust to external disturbances and has scalability that allows a user to flexibly add or remove components.

A conventional system is helpless to a failure or needs to prepare various error sequences. Furthermore, the stability of the overall system is not guaranteed to be maintained if components (resources) are added or removed arbitrarily. Programs and processes should be examined each time components are added or removed. In contrast, the method of this step can solve all of those problems through autonomous distributed adaptive control.

Figure 7:
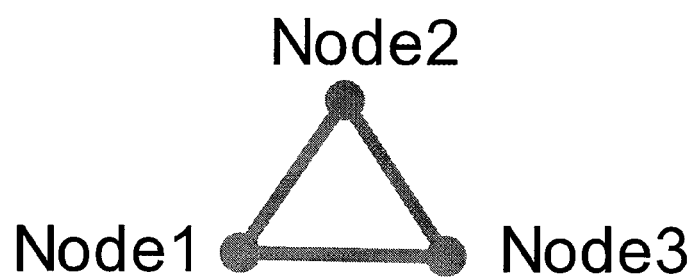
FIG. 7 is a diagram explanatory of a computer network system including three nodes.

A detailed operation of this control method will be described below. For simplification in this example, this control method is applied to a network state having a triangular structure in which three nodes are connected each other. FIG. 7 shows the structure of the network.

Figure 8:
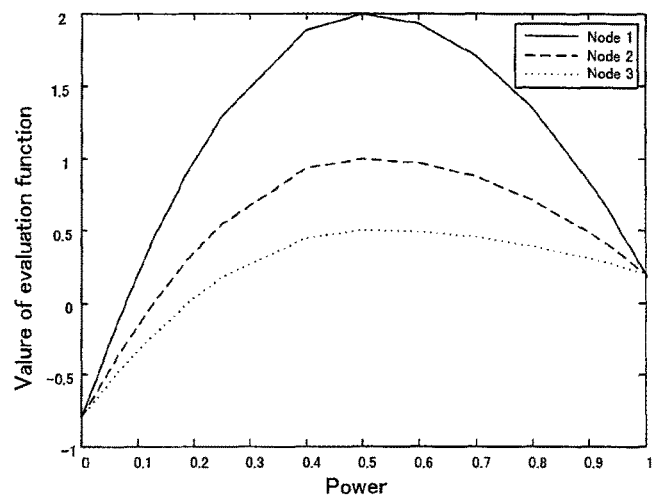
FIG. 8 is graphs showing evaluation functions, results of load distribution control, and slopes of the evaluation functions.
Figure 8:
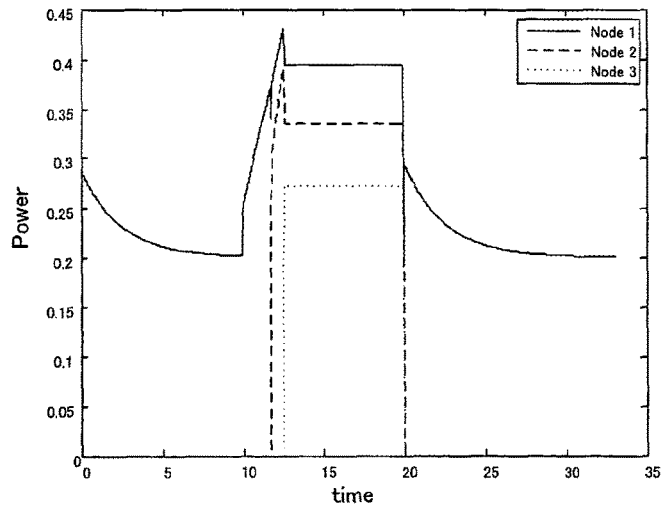
Figure 8:
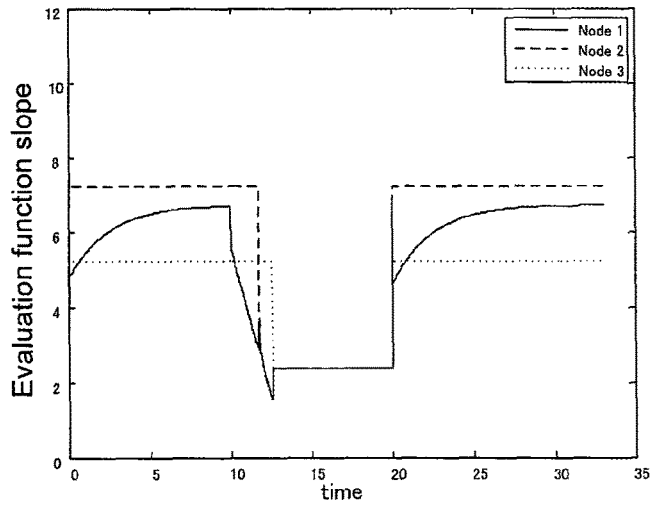

First, different evaluation functions shown in FIG. 8(a) were set to those three nodes. Then the activation/shutdown and the load distribution of the nodes were performed by the control method of the present invention while the overall demand was changed to 0.2 between a point of time 0 and a point of time 10, to 1.0 between the point of time 10 and a point of time 20, and to 0.2 after the point of time 20. FIG. 8(b) also shows those results. When the overall demand was 0.2, only the node 1 having the highest profit efficiency was activated. When the overall demand was increased to 1.0, the node 2 and the node 3 were activated in the order of performance. Thus, the load distribution was set. When the overall demand was changed to 0.2 again, the nodes 2 and 3 were shut down to return to the state where only the node 1 was activated. The control method of the present invention is designed so that the unit commitment problem is optimally solved in a mathematical manner. This means that the system can adapt to an external disturbance (a sudden change in demand) while solving the unit commitment problem in real-time (dynamically), which is a very significant achievement.

Figure 9:
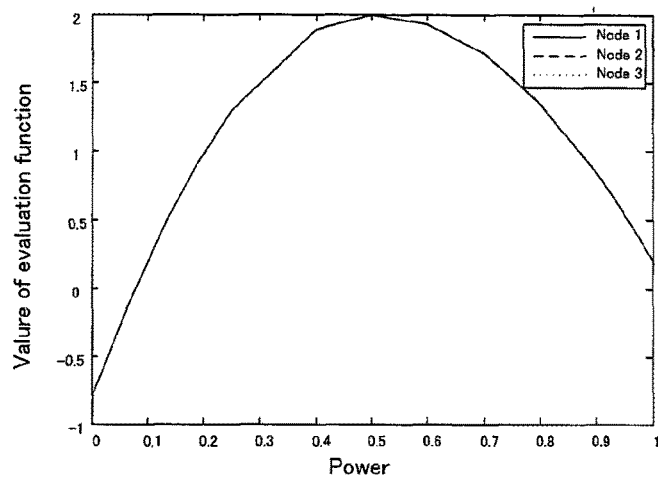
FIG. 9 is graphs showing evaluation functions, results of load distribution control, and slopes of the evaluation functions.
Figure 9:
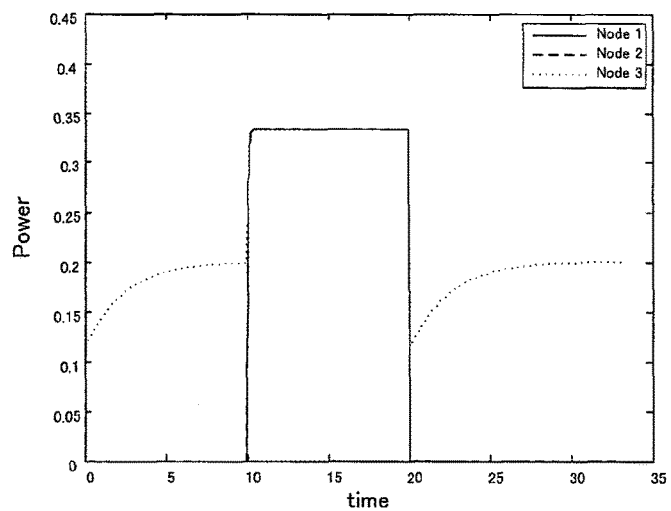
Figure 9:
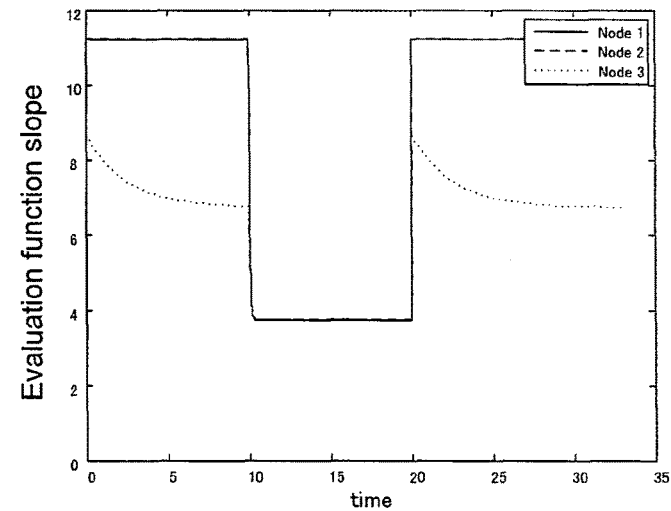

FIGS. 9(a) to 9(c) show an example of a case where three nodes had the same performance. All graphs of the evaluation functions for those nodes overlap one another, and only one graph can be seen. In this case, the overall demand was changed to 0.2 between a point of time 0 to a point of time 10, to 1.0 between the point of time 10 and a point of time 20, and to 0.2 after the point of time 20. When the overall demand was 0.2, only the node 3 was activated, which is difficult to see because all nodes had the same performance. When the overall demand was 1.0, the three nodes equally bore the loads. In this manner, the control method of the present invention can effectively perform optimization even if the system bears activation costs and includes nodes having the same performance.

According to the control method of this step, respective components are controlled such that differential values of the evaluation functions of those components are equalized. However, to equalize differential values of some functions of respective components is not essence of this control method. Rather, the essence of this control method is to equalize differential values of convex functions of respective components.

The aforementioned control can be performed such that each node implements a load change per unit time that is derived from the control formula of Formula 5 or Formula 6 in a case where loads are homogeneous and can be sliced in any way, or in a case where loads have analog values, or in similar cases. At that time, the differential values of the evaluation functions of adjacent nodes are used. Therefore, surrounding circumstances have been considered. Thus, a node should simply be subject to the control of Formula 5 or Formula 6. Circumstances of adjacent nodes do not need to be considered at the stage of control. Examples of the case where loads are homogeneous and can be sliced in any way include a case where a plurality of servers are prepared to distribute processing and a case where a plurality of CPUs are prepared to distribute processing. Examples of the case where loads have analog values include a case where generators in a generator network distribute their output powers to one another.

However, a problem arises if the aforementioned control is applied, for example, to data arrangement distribution of a data center. In the case of a data arrangement problem, transfer of loads is performed with a unit of data. Therefore, loads vary depending upon types of data and lose the homogeneity. Additionally, loads cannot be sliced continuously. Accordingly, the same load as calculated by Formula 5 or Formula 6 cannot necessarily be transferred. Furthermore, data are transferred from one node to another node via a network to achieve load distribution. The data causes a heavy load to the network. Therefore, the state of the network cannot be ignored.

(2) Selection of a Load Component to be Transferred

In this example, a load $\lambda_{ij}$ of data j in a data server i is expressed by the following Formula 9 where the frequency of access to the data j is defined by $K_{1j}$ and the number of replicas is defined by $K_{2j}$.

$$\lambda_{ij} = K_{1j}/K_{2j} \qquad \text{Formula 9}$$

(3) Evaluation Functions of the Computers $N_1$ and $N_2$

Generally, the response performance is evaluated for data arrangement load distribution of data servers. It is desired to minimize the response performance of the overall system of distributed data servers. An evaluation function that minimizes the response performance of a device for processing such as a server is derived in this example.

In view of the queuing theory, assuming that a load arrives with a Poisson distribution of an average $\lambda_i$ per unit time and that the system can process a load with a Poisson distribution of an average $\mu_{max}$ per unit time (M/M/1 queue), conditions for minimizing the response of the overall system are expressed by the following Formula 10.

$$\frac{\mu_{max} - \lambda_i}{\sqrt{\mu_{max}}} = const \qquad \text{Formula 10}$$

Figure 10:
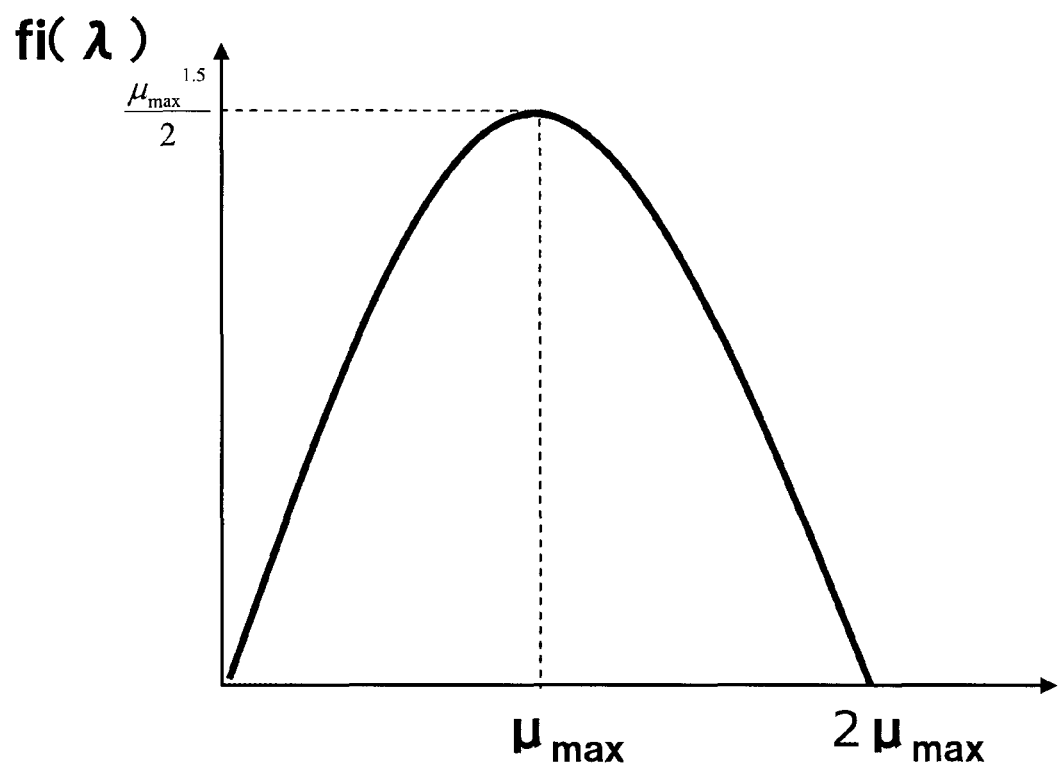
FIG. 10 is a graph showing an evaluation function.

The left side of Formula 10 is a linear function of the load $\lambda_i$. If the left side of Formula 10 is integrated with respect to $\lambda_i$, then a quadratic function of $\lambda_i$ is obtained. It has been known that a quadratic function is a convex function. Therefore, if the function obtained by integration of the left side of Formula 10 is regarded as an evaluation function of each node (server or the like), then Formula 10 means that the response is minimized when the nodes (servers or the like) have the same differential values of the evaluation functions, which are convex functions. In other words, this is the same control of Formula 5 and Formula 6. Specifically, the response of the overall system can be minimized in a steady state by setting, as an evaluation function for each node, a function obtained by integration of the left side of Formula 10 with respect to $\lambda_i$ and performing autonomous distributed control according to the present invention. $\mu_{max}$ is a parameter relating to the processing capability of a server, and the capability of a server can be expressed by this value. Therefore, not all servers in a group of servers may have the same performance. The system may include servers with various performances. If the left side of Formula 10 is integrated with respect to $\lambda_i$, the solution is indeterminate according to the degree of freedom of the constant. Accordingly, a function passing through the origin (0, 0) is set as an evaluation function for each of the data servers in this example. The evaluation function is determinate with $\mu_{max}$ and is a quadratic function having a peak value of $\mu_{max}^{1.5}$ and a peak position of $(\mu_{max}, \mu_{max}^{1.5}/2)$. FIG. 10 shows the evaluation function being set.

(4) The Evaluation Function of the Path $P_{1, 2}$

In this example, an evaluation function is also set to the networks. The networks (individual lines or links) can actually be regarded as a device that performs the same process as a server. When the networks are considered as processing a load of a packet being delivered every unit time, evaluation functions can be set in the same point of view as servers. When the processing capability of a network per unit time is defined by $\mu_{max, n}$, an evaluation function obtained by replacing $\mu_{max}$ used for a server with $\mu_{max, n}$ may be set to the network. For brevity, the processing capability of a network is also collectively referred to as $\mu_{max}$ in the following description. When a load imposed on a network i is defined by $\lambda_{i, n}$, in the present case of data transfer, $\lambda_{i, n}$ is expressed by the following Formula 11

$$\lambda_{i,n} = h_i(L_j) \qquad \text{Formula 11}$$

where $L_j$ represents the data length of certain data j.

In this example, the following Formula 12 is used as a result of measurement.

$$\lambda_{i,n} = L_j \qquad \text{Formula 12}$$

(5) Calculation of Evaluation Values $D_s$, $D_r$, and $D_n$

In this manner, evaluation functions are set to both of the data servers and the networks. It is necessary to set evaluation values $D_s$, $D_r$, and $D_n$ for determining whether or not to transfer data. In this example, the evaluation functions set to the data servers and the networks are defined such that the vertical axis represents the response-related amount. Therefore, the amount of response itself is defined as evaluation values $D_s$, $D_r$, and $D_n$.

Using the queuing theory, the relationship between the amount of response and the evaluation functions in this example can readily be obtained. Therefore, the evaluation values $D_s$, $D_r$, and $D_n$ are set by the following Formulas 13 to 15 where the number of a data server that transfers data is defined by i, the number of a data server that receives data is defined by j, and the number of a network used to transfer data is defined by k. The right side of each of the formulas converts an evaluation function to a response. Here, $\lambda_i$ represents loads of the entire data server i, $\lambda_j$ represents loads of the entire data server j, and $\lambda_k$ represents loads of the network between the data server i and the data server j.

$$D_s = \frac{1}{\sqrt{\mu_{max,i}}} \cdot \frac{1}{\left(\frac{df_i}{d\lambda_i}\right)} \qquad \text{Formula 13}$$

$$D_r = \frac{1}{\sqrt{\mu_{max,j}}} \cdot \frac{1}{\left(\frac{df_j}{d\lambda_j}\right)} \qquad \text{Formula 14}$$

$$D_n = \frac{1}{\sqrt{\mu_{max,k}}} \cdot \frac{1}{\left(\frac{df_k}{d\lambda_k}\right)} \qquad \text{Formula 15}$$

With the evaluation values calculated by Formula 13, Formula 14, and Formula 15, $D_s$ and the sum of $D_r + D_n$ are compared with each other. A final determination of data transfer is made if $D_r + D_n < D_s$.

Figure 11:
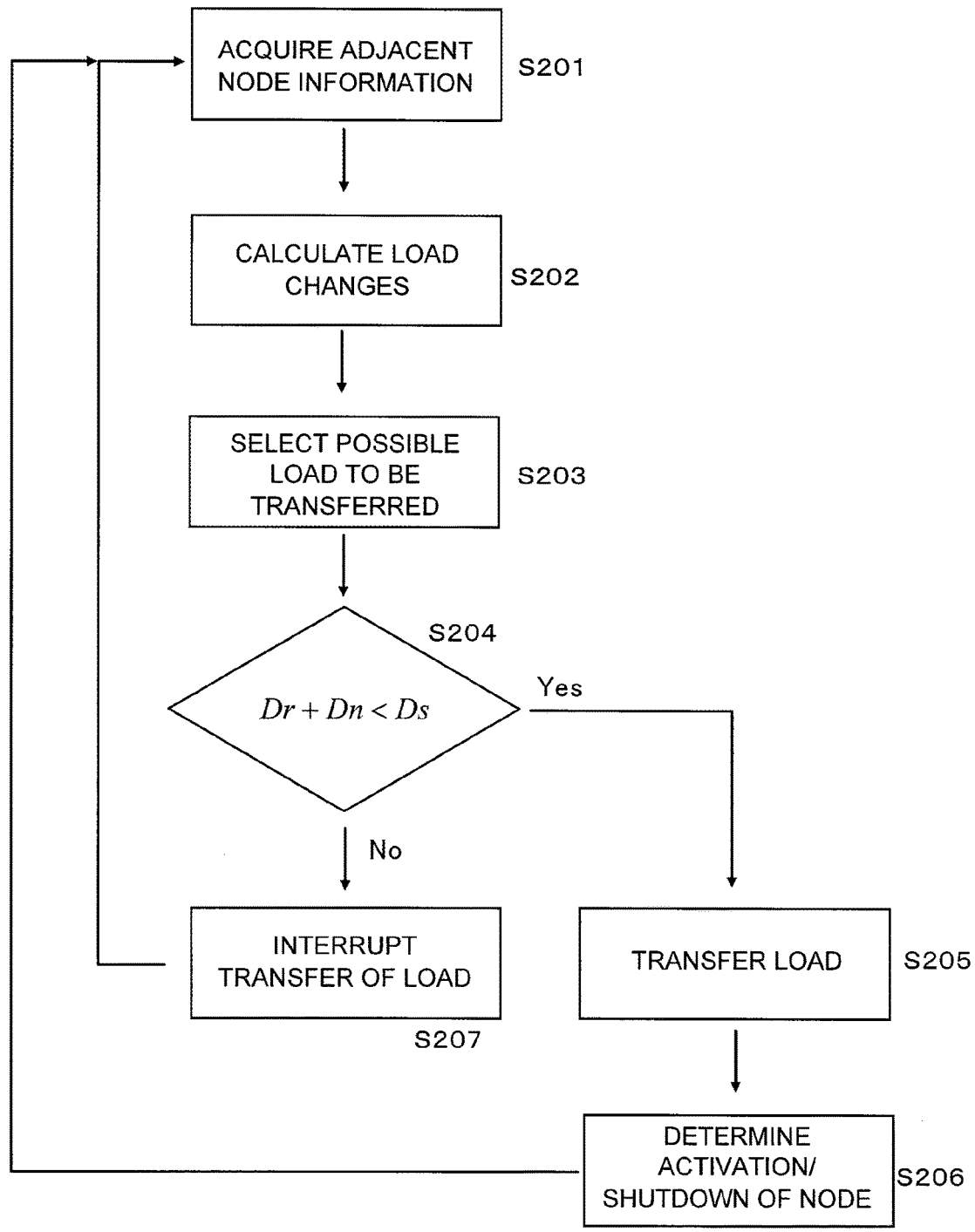
FIG. 11 is a flow chart explanatory of an operation of Example 1 according to the present invention.

Determination of whether or not a load should be transferred, which is made by each of nodes, will be described with reference to FIG. 11. A node acquires necessary information from another node that is adjacent to the node (Step S201), calculates a load change based upon the acquired information, and selects an adjacent node to which a load corresponding to the load change is to be transferred (Step S202).

Next, the node selects a load corresponding to the calculated load change from among loads borne by the node of interest (if the node is a data server, data objects held by the data server) (Step S203).

Then the node calculates the evaluation values $D_s$, $D_r$, and $D_n$. The evaluation value $D_s$ is a value for evaluating an influence received by the node of interest from the load selected in Step S203. The evaluation value $D_r$ is a value for evaluating an influence received by the adjacent node selected in Step S202 from the load selected in Step S203 if the selected adjacent node holds the selected load. The evaluation value $D_n$ is a value for evaluating an influence received by the network between the adjacent node selected in Step S202 and the node of interest from the load selected in Step S203 if the selected load is transferred via the network.

Furthermore, whether or not the relationship that $D_r + D_n < D_s$ is established is determined (Step S204). If the relationship that $D_r + D_n < D_s$ is established, the node sends the load to the adjacent node (Step S205), determines whether the node is left activated or is stopped (Step S206), and returns to Step S201. If the relationship that $D_r + D_n < D_s$ is not established, the node interrupts the transfer of the load (Step S207) and returns to Step S201.

When the evaluation values $D_s$, $D_r$, and $D_n$ are calculated, there are several variations with respect to which an internal state (load) is used for a differential value of an evaluation function. One of the simplest one is to use a differential value of an evaluation function of the current internal state. Another example is to use a differential value of an evaluation function of an internal state in which a load newly generated by data transfer has been added to the current internal state, which achieves higher accuracy. Furthermore, there may be used a differential value of an evaluation function of an internal state in which a load newly generated by data reception has been added. In this example, a differential value of an evaluation function of the current internal state is used.

(6) Advantageous Effects of Example 1

In this example, the advantageous effects of the present invention were examined by monitoring changes of queues with time. A queue refers to the number of process requests held on a server at a certain point of time. More queues mean that the processing is being delayed so that the response of the overall system is low. In this example, the number of queues is the same as the number of accesses. Thirty data servers (three types of processing capabilities for 10 servers) are prepared, and 200 sets of data of almost 1 kB (in which data of about 10 kB are sometimes mixed) are arranged randomly in the overall system. The three types of data servers include a type that performs 120 processes per unit time, a type that performs 90 processes per unit time, and a type that performs 60 processes per unit time. Each set of data is accessed with a Poisson distribution having an average of 6 per unit time. This access is a load, i.e., a process.

Figure 12:
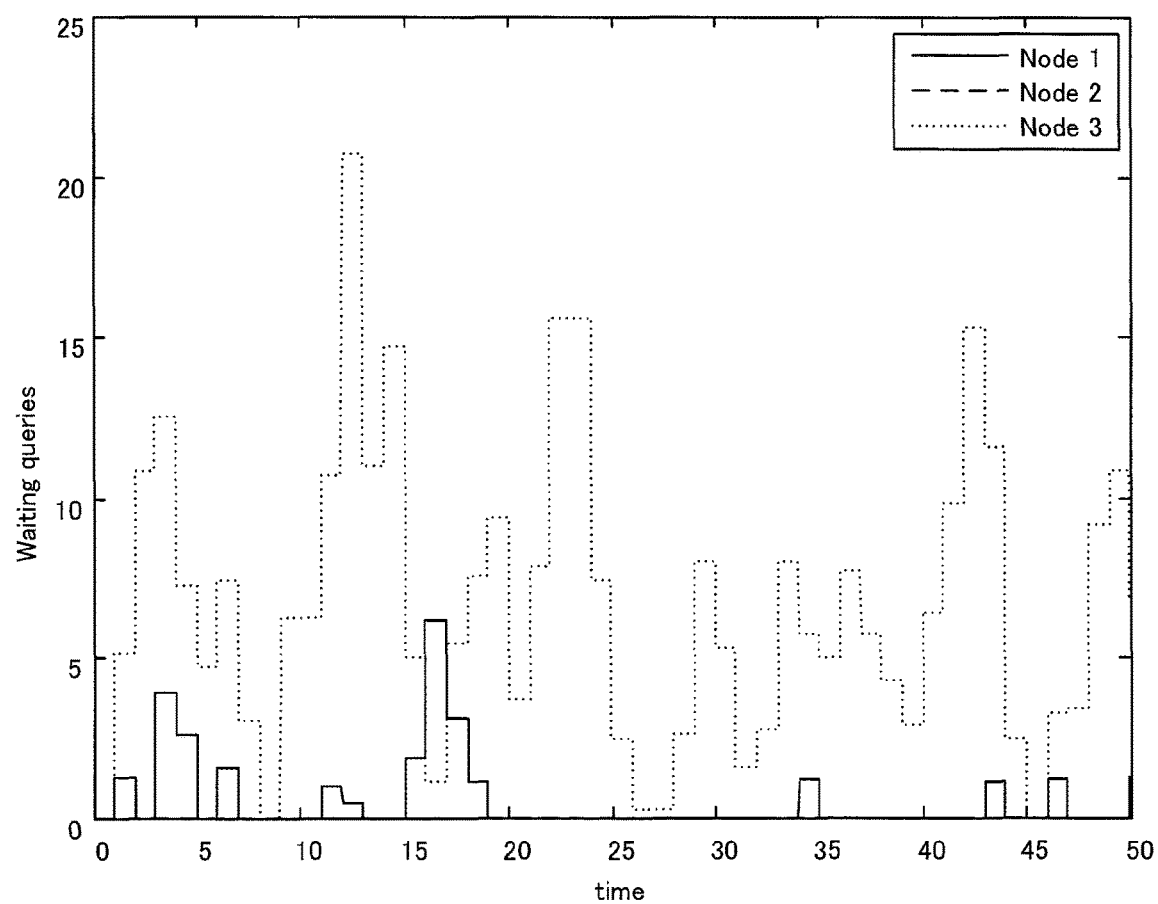
FIG. 12 is a graph showing time-varying queues in a case to which the present invention has not been applied.

First, changes of queues with time in a case where the present invention is not applied are shown in FIG. 12, which shows the results for node numbers 1, 2, and 3. Those nodes had a processing capability of 120, 90, and 60, respectively. It can be seen that queues of the node 3, which had a relatively low processing capability, tended to be plied up. With regard to the rest of the nodes (data servers), almost the same results were obtained for each of processing capabilities. The response of the overall system was 0.089 sec.

Figure 13:
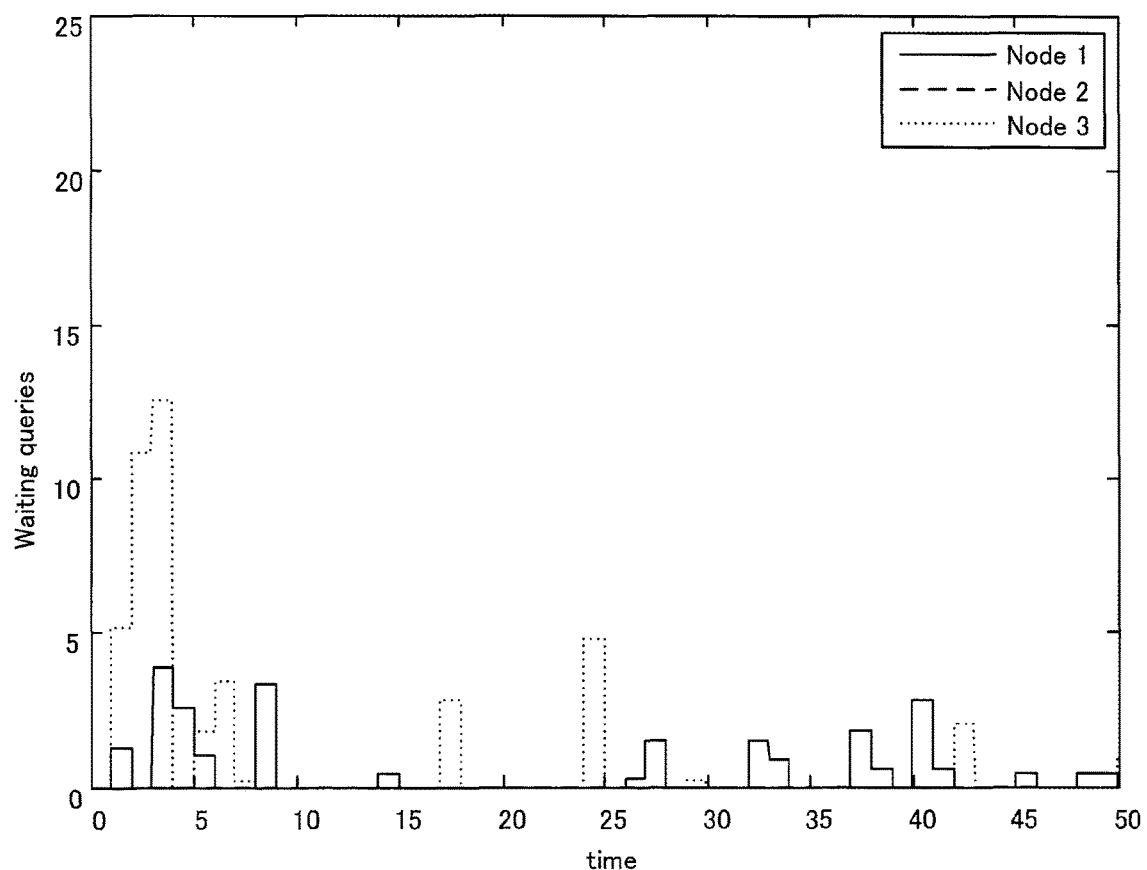
FIG. 13 is a graph showing an example of time-varying queues in a case to which the present invention has been applied.

Next, FIG. 13 shows the results of the case where the network had a bandwidth of 100 kbps in a computer network system to which the present invention was applied. Since the data capacity was 1 kB, the data arrangement load distribution would have been performed. From the results, it can be seen that queues of the node 3, which had tended to be piled up, were reduced. The response of the overall system was 0.021 sec., which was remarkably improved. Thus, the effectiveness of the present invention has been proved.

Figure 14:
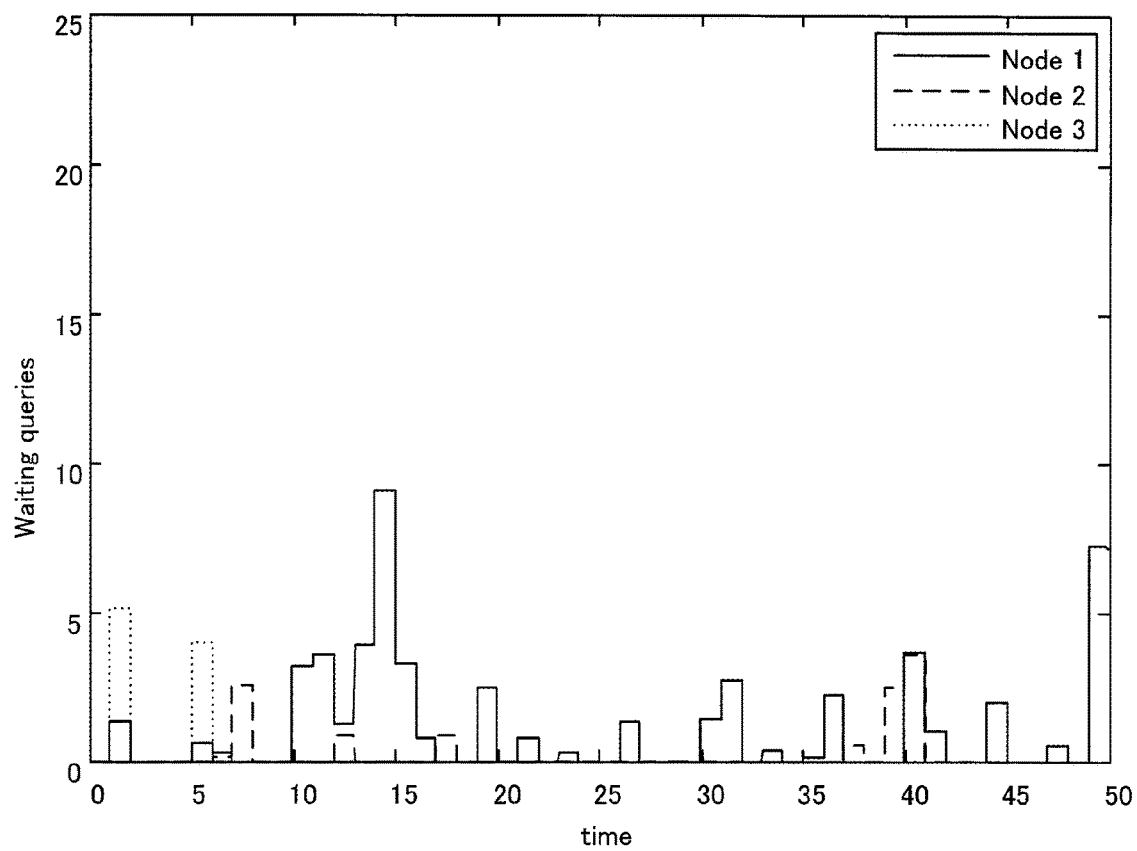
FIG. 14 is a graph showing an example of time-varying queues in a case to which the present invention has been applied.

Furthermore, FIG. 14 shows the results of the case where the network had a bandwidth of 1 Mbps in a computer network system to which the present invention was applied. There were few queues of the node 3, which had tended to be piled up. Rather, queues of the node 1 were increased. Since the node 1 has a relatively high processing capability, it is suggested that data were concentrated to a node having a high capability. The response of the overall system was 0.014 sec., which was further improved. Thus, the effectiveness of the present invention has been proved.

FIG. 15 shows the number of pieces of data stored in the aforementioned nodes after 50 seconds. It can be seen that more data are placed to a node having a high capability as the response of the network is further improved. The number of optimal pieces of data to be arranged that is derived from Formula 10 under the current conditions was calculated as being the same as in the case of 1 Mbps of FIG. 15. In other words, optimal data arrangement has been achieved by the present invention.

(Example 2)

Example 1 illustrates data arrangement load distribution control of data servers. However, the present invention can be applied to load distribution control of processes rather than data. In this example, load distribution of processes with use of the present invention will be described. This example uses the same arrangement as Example 1. Data servers are servers that perform processes without data transfer. The present invention is used to distribute processes provided to the respective servers with a Poisson distribution. At that time, the relationship between processes and data does not need to be expressed as Formula 9 unlike Example 1. The number of currently bearing processes can be regarded as loads. It is assumed that the processes are homogeneous. Therefore, this example can determine that loads equivalent to loads to be transferred that have been determined by Formula 5 or Formula 6 are transferred. After determination of the amount of transfer, as with Example 1, an evaluation of $D_r + D_n < D_s$ was made to determine whether or not to transfer the loads. Thus, it can be found that the load distribution of processes produces the same results as obtained by implementing Example 1 without evaluating individual loads.

With the same setting as in Example 1, 30 servers (three types of processing capabilities for 10 data servers) are prepared. The three types of data servers include a type that performs 120 processes per unit time, a type that performs 90 processes per unit time, and a type that performs 60 processes per unit time. Processes reach each of the servers with a Poisson distribution having an average of 60 per unit time. As a result of experiments, use of the present invention achieved the response performance about 10 times the response performance obtained without use of the present invention. Thus, the effectiveness of the present invention has also been proved with regard to load distribution of servers.

In Example 2, for example, the number of processes waiting for transfer relates to loads of the network. The evaluation function can be calculated in the same manner as in Example 1 based upon the transfer capability ($\mu_{max}$) of the network. At that time, the number of processes waiting for network transfer is associated with loads. To be more precise, $\mu_{max}$ −(the number of loads that have reached/the number of waiting processes) is loads of the node of interest. To consider the number of waiting processes as direct loads is a kind of approximation.

While the present invention has been described above along with the embodiments and examples, the present invention is not limited to those embodiments and examples.

This application claims the benefit of priority from Japanese patent application No. 2012-173520, filed on Aug. 6, 2012, the disclosure of which is incorporated herein in its entirety by reference.

The invention claimed is:

1. A computer network system comprising a plurality of nodes each of which is connected to another node via at least one path, the plurality of nodes comprising at least a first node $N_1$ and a second node $N_2$ connected to the first node $N_1$ via a path P, the computer network system comprising:
a computer configured to:
determine a load $\lambda_x$ subjected to examination of whether or not to be transferred to the second node $N_2$, the load being currently borne by the first node $N_1$;
select a load component that causes a load corresponding to the load $\lambda_x$ to the first node $N_1$ from among load components currently held by the first node;
calculate an evaluation value $D_1$ for evaluating responsiveness of the first node $N_1$ when the first node $N_1$ bears an overall load comprising the load caused by the selected load component, an evaluation value $D_n$ for evaluating responsiveness of the path P assuming that the path P bears a load caused by transfer of the selected load component in addition to a load currently borne by the path P, and an evaluation value $D_2$ for evaluating responsiveness of the second node $N_2$ assuming that the second node $N_2$ bears a load caused by the selected load component in addition to a load currently borne by the second node; and determine whether or not to transfer the transfer load component depending upon comparison of magnitude of $D_1$ and a sum of $D_2 + D_n$, wherein the load component is a data object d, and the load caused by the load component is a load that is caused by a node holding the data object d and is borne by the node, and wherein evaluation functions $f_1$, $f_2$, and $f_n$ corresponding to performances of the first node $N_1$, the second node $N_2$, and the path P, respectively, are predetermined, and the evaluation functions are a convex function having at least a variable of a load λ that is currently borne by the node of interest or the path or is to transferred, and wherein the evaluation value $D_1$ is determined based upon the evaluation function $f_1$, the evaluation value $D_2$ is determined based upon the evaluation function $f_2$, and the evaluation value $D_n$ is determined based upon the evaluation function $f_n$, and wherein relationships expressed by the following Mathematical Expression 1 are found between the evaluation values $D_1$, $D_2$, and $D_n$, and the evaluation functions $f_1$, $f_2$ and $f_n$ where coefficients determined depending upon processing capabilities of the first node $N_1$, the second node $N_2$, and the path P per unit time are defined by $\mu_{max,\,1}$, $\mu_{max,\,2}$, and $\mu_{max,\,n}$.

$$\left. \begin{aligned} D_1 &= \frac{1}{\sqrt{\mu_{max,1}}} \cdot \frac{1}{\left(\frac{df_1}{d\lambda_1}\right)} \\ D_2 &= \frac{1}{\sqrt{\mu_{max,2}}} \cdot \frac{1}{\left(\frac{df_2}{d\lambda_2}\right)} \\ D_n &= \frac{1}{\sqrt{\mu_{max,n}}} \cdot \frac{1}{\left(\frac{df_n}{d\lambda_n}\right)} \end{aligned} \right\} \quad \text{Mathematical Expression 1}$$

2. The computer network system of claim 1, wherein the evaluation value $D_1$ is determined based upon a derivative of the evaluation function $f_1$, the evaluation value $D_2$ is determined based upon a derivative of the evaluation function $f_2$, the evaluation value $D_n$ is determined based upon a derivative of the evaluation function $f_n$.

3. The computer network system of claim 1, wherein the load $\lambda_x$ is calculated by $\lambda_x = K(df_s/\lambda_s - df_r/\lambda_r)$, where K is a predetermined proportionality constant.

4. The computer network system of claim 1, wherein the computer is further configured to calculate a load $\lambda_d$ caused to a node holding the data object d by the data object d based upon a function $g_d$, the function $g_d$ being a predetermined function having variables of m types of observable values $K_{1d}, K_{2d}, \ldots, K_{md}$ with respect to the data object d where m is a natural number.

5. The computer network system of claim 4, wherein any of the observable values $K_{1d}, K_{2d}, \ldots, K_{md}$ is a frequency of access to the data object d.

6. The computer network system of claim 4, wherein any of the observable values $K_{1d}, K_{2d}, \ldots, K_{md}$ is the number of replicas of the data object d.

7. The computer network system of claim 1, wherein the load component is a process, and the load caused by the load component is a load that is caused by a node performing the process and is borne by the node.

8. A computer in a computer network system comprising a plurality of nodes each of which is connected to another node via at least one path, the plurality of nodes comprising at least a first node $N_1$ and a second node $N_2$ connected to the first node $N_1$ via a path P, the computer operating as one of the plurality of nodes, the computer configured to:

determine a load $\lambda_x$ subjected to examination of whether or not to be transferred to the second node $N_2$, the load being currently borne by the first node $N_1$;

select a load component that causes a load corresponding to the load $\lambda_x$ to the first node $N_1$ from among load components currently held by the first node;

calculate an evaluation value $D_1$ for evaluating responsiveness of the first node $N_1$ when the first node $N_1$ bears an overall load comprising the load caused by the selected load component, an evaluation value $D_n$ for evaluating responsiveness of the path P assuming that the path P bears a load caused by the selected load component in addition to a load currently borne by the path P, and an evaluation value $D_2$ for evaluating responsiveness of the second node $N_2$ assuming that the second node $N_2$ bears a load caused by the selected load component in addition to a load currently borne by the second node; and determine whether or not to transfer the transfer load component depending upon comparison of magnitude of $D_1$ and a sum of $D_2 + D_n$, wherein the load component is a data object d, and the load caused by the load component is a load that is caused by a node holding the data object d and is borne by the node, and wherein evaluation functions $f_1$, $f_2$, and $f_n$ corresponding to performances of the first node $N_1$, the second node $N_2$, and the path P, respectively, are predetermined, the evaluation functions are a convex function having at least a variable of a load λ that is currently borne by the node of interest or the path or is to transferred, and wherein the evaluation value $D_1$ is determined based upon the evaluation function $f_1$, the evaluation value $D_2$ is determined based upon the evaluation function $f_2$, and the evaluation value $D_n$ is determined based upon the evaluation function $f_n$, and wherein relationships expressed by the following Mathematical Expression 2 are found between the evaluation values $D_1$, $D_2$, and $D_n$ and the evaluation functions $f_1$, $f_2$, and $f_n$ where coefficients determined depending upon processing capabilities of the first node $N_1$, the second node $N_2$, and the path P per unit time are defined by $\mu_{max,\,1}$, $\mu_{max,\,2}$, and $\mu_{max,\,n}$.

$$\left. \begin{aligned} D_1 &= \frac{1}{\sqrt{\mu_{max,1}}} \cdot \frac{1}{\left(\frac{df_1}{d\lambda_1}\right)} \\ D_2 &= \frac{1}{\sqrt{\mu_{max,2}}} \cdot \frac{1}{\left(\frac{df_2}{d\lambda_2}\right)} \\ D_n &= \frac{1}{\sqrt{\mu_{max,n}}} \cdot \frac{1}{\left(\frac{df_n}{d\lambda_n}\right)} \end{aligned} \right\} \quad \text{Mathematical Expression 2}$$

9. The computer of claim 8, wherein the evaluation value $D_1$ is determined based upon a derivative of the evaluation function $f_1$, the evaluation value $D_2$ is determined based upon a derivative of the evaluation function $f_2$, the evaluation value $D_n$ is determined based upon a derivative of the evaluation function $f_n$.

10. The computer of claim 8, wherein the load $\lambda_x$ is calculated by $\lambda_x = K(df_s/\lambda_s - df_r/\lambda_r)$, where K is a predetermined proportionality constant.

11. The computer of claim 8, further configured to calculate a load $\lambda_d$ caused to a node holding the data object d by the data object d based upon a function $g_d$, the function $g_d$ being a predetermined function having variables of m types of observable values $K_{1d}, K_{2d}, \ldots, K_{md}$ with respect to the data object d where m is a natural number.

12. The computer of claim 11, wherein any of the observable values $K_{1d}, K_{2d}, \ldots, K_{md}$ is a frequency of access to the data object d.

13. The computer of claim 11, wherein any of the observable values $K_{1d}, K_{2d}, \ldots, K_{md}$ is the number of replicas of the data object d.

14. The computer of claim 8, wherein the load component is a process, and the load caused by the load component is a load that is caused by a node performing the process and is borne by the node.

15. A program executed by a computer in a computer network system, the computer network comprising a plurality of nodes each of which is connected to another node via at least one path, the plurality of nodes comprising at least a first node $N_1$ and a second node $N_2$ connected to the first node $N_1$ via a path P, the computer operating as one of the plurality of nodes, the computer executing the program to perform steps comprising:
   determining a load $\lambda_x$ subjected to examination of whether or not to be transferred to the second node $N_2$, the load being currently borne by the first node $N_1$;
   selecting a load component that causes a load corresponding to the load $\lambda_x$ to the first node $N_1$ from among load components currently held by the first node;
   calculating an evaluation value $D_1$ for evaluating responsiveness of the first node $N_1$ when the first node $N_1$ bears an overall load comprising the load caused by the selected load component, an evaluation value $D_n$ for evaluating responsiveness of the path P assuming that the path P bears a load caused by transfer of the selected load component in addition to a load currently borne by the path P, and an evaluation value $D_2$ for evaluating responsiveness of the second node $N_2$ assuming that the second node $N_2$ bears a load caused by the selected load component in addition to a load currently borne by the second node; and
   determining whether or not to transfer the transfer load component depending upon comparison of magnitude of $D_1$ and a sum of $D_2 + D_n$,
wherein the load component is a data object d, and the load caused by the load component is a load that is caused by a node holding the data object d and is borne by the node, and
wherein evaluation functions $f_1$, $f_2$, and $f_n$ corresponding to performances of the first node $N_1$, the second node $N_2$, and the path P, respectively, are predetermined, the evaluation functions are a convex function having at least a variable of a load $\lambda$ that is currently borne by the node of interest or the path or is to transferred, and
wherein the evaluation value $D_1$ is determined based upon the evaluation function $f_1$, the evaluation value $D_2$ is determined based upon the evaluation function $f_2$, and the evaluation value $D_n$ is determined based upon the evaluation function $f_n$, and
wherein relationships expressed by the following Mathematical Expression 3 are found between the evaluation values $D_1$, $D_2$, and $D_n$ and the evaluation functions $f_1$, $f_2$, and $f_n$ where coefficients determined depending upon processing capabilities of the first node $N_1$, the second node $N_2$, and the path P per unit time are defined by $\mu_{max, 1}$, $\mu_{max, 2}$, and $\mu_{max, n}$.

$$\left. \begin{array}{l} D_1 = \dfrac{1}{\sqrt{\mu_{max,1}}} \cdot \dfrac{1}{\left(\dfrac{df_1}{d\lambda_1}\right)} \\[2ex] D_2 = \dfrac{1}{\sqrt{\mu_{max,2}}} \cdot \dfrac{1}{\left(\dfrac{df_2}{d\lambda_2}\right)} \\[2ex] D_n = \dfrac{1}{\sqrt{\mu_{max,n}}} \cdot \dfrac{1}{\left(\dfrac{df_n}{d\lambda_n}\right)} \end{array} \right\} \quad \text{Mathematical Expression 3}$$

16. The program of claim 15,
   wherein the evaluation value $D_1$ is determined based upon a derivative of the evaluation function $f_1$,
   the evaluation value $D_2$ is determined based upon a derivative of the evaluation function $f_2$,
   the evaluation value $D_n$ is determined based upon a derivative of the evaluation function $f_n$.

17. The program of claim 15, wherein the load $\lambda_x$ is calculated by $\lambda_x = K(df_s/\lambda_s - df_r/\lambda_r)$ where K is a predetermined proportionality constant.

18. The program of claim 15, the computer executing the program to perform further steps comprising calculating a load $\lambda_d$ caused to a node holding the data object d by the data object d based upon a function $g_d$, the function $g_d$ being a predetermined function having variables of m types of observable values $K_{1d}, K_{2d}, \ldots, K_{md}$ with respect to the data object d where m is a natural number.

19. The program of claim 18, wherein any of the observable values $K_{1d}, K_{2d}, \ldots, K_{md}$ is a frequency of access to the data object d.

20. The program of claim 18, wherein any of the observable values $K_{1d}, K_{2d}, \ldots, K_{md}$ is the number of replicas of the data object d.

21. The program of claim 15, wherein the load component is a process, and the load caused by the load component is a load that is caused by a node performing the process and is borne by the node.

22. A computer-executable method of determining whether or not to transfer a load between nodes in a computer network system comprising a plurality of nodes each of which is connected to another node via at least one path, the plurality of nodes comprising at least a first node $N_1$ and a second node $N_2$ connected to the first node $N_1$ via a path P, the method comprising:
   determining a load $\lambda_x$ subjected to examination of whether or not to be transferred to the second node $N_2$, the load being currently borne by the first node $N_1$;
   selecting a load component that causes a load corresponding to the load $\lambda_x$ to the first node $N_1$ from among load components currently held by the first node;
   calculating an evaluation value $D_1$ for evaluating responsiveness of the first node $N_1$ when the first node $N_1$ bears an overall load comprising the load caused by the selected load component, an evaluation value $D_n$ for evaluating responsiveness of the path P assuming that the path P bears a load caused by transfer of the selected load component in addition to a load currently borne by the path P, and an evaluation value $D_2$ for evaluating responsiveness of the second node $N_2$ assuming that the second node $N_2$ bears a load caused by the selected load component in addition to a load currently borne by the second node; and determining whether or not to transfer the transfer load component depending upon comparison of magnitude of $D_1$ and a sum of $D_2+D_n$, wherein the load component is a data object d, and the load caused by the load component is a load that is caused by a node holding the data object d and is borne by the node, and wherein evaluation functions $f_1$, $f_2$, and $f_n$ corresponding to performances of the first node $N_1$, the second node $N_2$, and the path P, respectively, are predetermined, the evaluation functions are a convex function having at least a variable of a load $\lambda$ that is currently borne by the node of interest or the path or is to transferred, and wherein the evaluation value $D_1$ is determined based upon the evaluation function $f_1$, the evaluation value $D_2$ is determined based upon the evaluation function $f_2$, and the evaluation value $D_n$ is determined based upon the evaluation function $f_n$, and wherein relationships expressed by the following Mathematical Expression 4 are found between the evaluation values $D_1$, $D_2$, and $D_n$ and the evaluation functions $f_1$, $f_2$, and $f_n$ where coefficients determined depending upon processing capabilities of the first node $N_1$, the second node $N_2$, and the path P per unit time are defined by $\mu_{max,\,1}$, $\mu_{max,\,2}$, and $\mu_{max,\,n}$ $$\left. \begin{aligned} D_1 &= \frac{1}{\sqrt{\mu_{max,1}}} \cdot \frac{1}{\left(\frac{df_1}{d\lambda_1}\right)} \\ D_2 &= \frac{1}{\sqrt{\mu_{max,2}}} \cdot \frac{1}{\left(\frac{df_2}{d\lambda_2}\right)} \\ D_n &= \frac{1}{\sqrt{\mu_{max,n}}} \cdot \frac{1}{\left(\frac{df_n}{d\lambda_n}\right)} \end{aligned} \right\}$$

Mathematical Expression 4

23. The method of claim 22, wherein the evaluation value $D_1$ is determined based upon a derivative of the evaluation function $f_1$, the evaluation value $D_2$ is determined based upon a derivative of the evaluation function $f_2$, the evaluation value $D_n$ is determined based upon a derivative of the evaluation function $f_n$.

24. The method of claim 22, wherein the load $\lambda_x$ is calculated by $\lambda_x = K(df_s/\lambda_s - df_r/\lambda_r)$ where K is a predetermined proportionality constant.

25. The method of claim 22, further comprising calculating a load $\lambda_d$ caused to a node holding the data object d by the data object d based upon a function $g_d$, the function $g_d$ being a predetermined function having variables of m types of observable values $K_{1d}$, $K_{2d}$, ..., $K_{md}$ with respect to the data object d where m is a natural number.

26. The method of claim 25, wherein any of the observable values $K_{1d}$, $K_{2d}$, ..., $K_{md}$ is a frequency of access to the data object d.

27. The method of claim 25, wherein any of the observable values $K_1$, $K_{2d}$, ..., $K_{md}$ is the number of replicas of the data object d.

28. The method of claim 22, wherein the load component is a process, and the load caused by the load component is a load that is caused by a node performing the process and is borne by the node.

* * * * *

UNITED STATES PATENT AND TRADEMARK OFFICE
CERTIFICATE OF CORRECTION

PATENT NO.        : 9,712,609 B2
APPLICATION NO.   : 14/420127
DATED             : July 18, 2017
INVENTOR(S)       : Masatsugu Ogawa et al.

Page 1 of 1

It is certified that error appears in the above-identified patent and that said Letters Patent is hereby corrected as shown below:

(73) Assignee should read:
NEC Corporation, Tokyo (JP)
Masafumi YANO, Miyagi (JP)

Signed and Sealed this
Twenty-seventh Day of March, 2018

Andrei Iancu
*Director of the United States Patent and Trademark Office*